(12) United States Patent
Hisamitsu

(10) Patent No.: US 9,599,758 B2
(45) Date of Patent: Mar. 21, 2017

(54) OPTICAL REFLECTIVE FILM AND OPTICAL REFLECTOR USING THE SAME

(71) Applicant: Konica Minolta, Inc., Tokyo (JP)

(72) Inventor: Akihito Hisamitsu, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 74 days.

(21) Appl. No.: 14/440,499

(22) PCT Filed: Oct. 1, 2013

(86) PCT No.: PCT/JP2013/076740
§ 371 (c)(1),
(2) Date: May 4, 2015

(87) PCT Pub. No.: WO2014/073291
PCT Pub. Date: May 15, 2014

(65) Prior Publication Data
US 2015/0285974 A1    Oct. 8, 2015

(30) Foreign Application Priority Data

Nov. 8, 2012 (JP) ................................. 2012-246423
Jan. 28, 2013 (JP) ................................. 2013-013764

(51) Int. Cl.
G02B 5/08    (2006.01)
G02B 5/28    (2006.01)
B32B 27/30   (2006.01)
G02B 1/10    (2015.01)
G02B 5/26    (2006.01)

(52) U.S. Cl.
CPC ............. *G02B 5/287* (2013.01); *B32B 27/306* (2013.01); *G02B 1/10* (2013.01); *G02B 5/0816* (2013.01); *G02B 5/0841* (2013.01); *G02B 5/26* (2013.01); *G02B 5/28* (2013.01); *B32B 2551/00* (2013.01)

(58) Field of Classification Search
CPC .. G02B 5/0816; G02B 5/0825; G02B 5/0833; G02B 5/0841

USPC .................. 359/584, 586, 588, 359; 430/619
See application file for complete search history.

(56) References Cited

U.S. PATENT DOCUMENTS

| | | | |
|---|---|---|---|
| 2006/0216660 A1* | 9/2006 | Oyamada | G03C 1/49863 430/619 |
| 2013/0107355 A1 | 5/2013 | Kokeguchi et al. | |
| 2014/0285896 A1* | 9/2014 | Hisamitsu | C09D 5/004 359/584 |
| 2015/0168618 A1* | 6/2015 | Nakajima | B32B 7/02 359/359 |

FOREIGN PATENT DOCUMENTS

| | | |
|---|---|---|
| JP | H8110401 A | 4/1996 |
| JP | 2004123766 A | 4/2004 |
| WO | 2012014607 A1 | 2/2012 |
| WO | 2012014644 A1 | 2/2012 |
| WO | 2012014654 A1 | 2/2012 |
| WO | 2012161096 A1 | 11/2012 |
| WO | 2013065679 A1 | 5/2013 |
| WO | 2013179902 A1 | 5/2013 |

OTHER PUBLICATIONS

International Search Report dated Jan. 14, 2014 for Application No. PCT/JP2013/076740 with English translation.

* cited by examiner

*Primary Examiner* — Audrey Y Chang
(74) *Attorney, Agent, or Firm* — Lucas & Mercanti, LLP

(57) ABSTRACT

An optical reflective film which includes at least one unit formed by laminating a high refractive index layer and a low refractive index layer on a substrate and is characterized in that at least either of the high refractive index layer or the low refractive index layer contains two or more kinds of polyvinyl alcohols having different degrees of saponification, the high refractive index layer and the low refractive index layer contain polyvinyl alcohols having approximately the same degree of saponification, and an average degree of saponification of polyvinyl alcohols contained in the high refractive index layer and an average degree of saponification of polyvinyl alcohols contained in the low refractive index layer are different from each other.

12 Claims, No Drawings

… … …

OPTICAL REFLECTIVE FILM AND OPTICAL REFLECTOR USING THE SAME

CROSS REFERENCE TO RELATED APPLICATION

This Application is a 371 of PCT/JP2013/076740 filed on Oct. 1, 2013 which, in turn, claimed the priority of Japanese Patent Application No. JP2012-246423 filed on Nov. 8, 2012 and Japanese Patent Application No. JP2013-013764 filed on Jan. 28, 2013, all applications are incorporated herein by reference.

TECHNICAL FIELD

The present invention relates to an optical reflective film which can be suitably used for a metallic luster tone film, a visible light colored film, and a thermal insulating film, and an optical reflector using the same.

BACKGROUND ART

In recent years, an increased concern for the energy saving measures has led to an active development of the infrared shielding film to block the transmission of heat rays in the sunlight entering through the window glass of a building and a vehicle. This makes it possible to reduce the load on the cooling facilities so as to be an effective energy saving measure.

Hitherto, a proposal is disclosed in which a laminated film formed by alternately laminating a high refractive index layer and a low refractive index layer as the infrared shielding film is fabricated by a dry film forming method such as a vapor deposition method or sputtering. In addition, it is also known that the laminated film can be designed so as to reflect visible light instead of near infrared light by adjusting the optical film thickness of the laminated film formed by the alternate lamination.

However, the dry film forming method has problems that the manufacturing cost is high, it is difficult to manufacture a large area film, and the method is limited to a heat resistant material.

Hence, a method using a thermosetting resin (JP 8-110401 A) and a method using a UV curing resin (JP 2004-123766 A) are disclosed as the method to fabricate the film by a coating method. These methods are advantageous in respect of the manufacturing cost, a large area and the like but undesirable in respect of the environmental conservation since both of them are a method using a large amount of organic solvents. Therefore, the water-based coating is preferable for the manufacture of the film and a water-soluble polymer capable of being coated by the water-based coating is preferable as the resin used in the coating liquid from the viewpoint of such environmental conservation. For example, an infrared shielding film is disclosed in WO 2012/014607 A which is formed of a refractive index layer containing a polyvinyl alcohol of a water-soluble polymer and a metal oxide.

Incidentally, there are a sequential coating to laminate the layers by coating and drying one by one and a simultaneous multilayer coating to coat a plurality of layers at the same time as a general method to fabricate a laminated film by coating two or more layers on a substrate. There are spin coating, bar coating, blade coating, and gravure coating as the sequential coating, but the productivity by the sequential coating is low since the number of coating and drying increases in the case of fabricating a multilayer film such as an optical reflective film. On the other hand, there is a method using curtain coating or slide bead coating as the simultaneous multilayer coating, and the productivity by the method is high since a plurality of layers can be formed at the same time.

SUMMARY OF INVENTION

Technical Problem

However, the coating film obtained by the multilayer coating is prone to cause the mixing between the adjacent layers and the disturbance (unevenness) at interface. It is required to control the interlaminar mixing at an appropriate level since a decrease in reflectance at a specific wavelength occurs, which is not preferable, when the interlaminar mixing is too significant.

The invention has been made in view of the above circumstances, and an object of the invention is to provide an optical reflective film which is excellent in light reflection property at the desired wavelength and further exhibits favorable light reflection characteristic and adhesiveness even in an environment exposed to a severe temperature change, and on an optical reflector using the same.

Solution to Problem

The inventors have conducted intensive investigations to solve the above problems, and as a result, it has been found out that the object of the invention can be achieved by adopting the following configuration.

Specifically, the present invention relates to an optical reflective film including: at least one unit formed by laminating a high refractive index layer and a low refractive index layer on a substrate, wherein at least either of the high refractive index layer or the low refractive index layer contains two or more kinds of polyvinyl alcohols having different degrees of saponification; the high refractive index layer and the low refractive index layer contain polyvinyl alcohols having approximately the same degree of saponification; and an average degree of saponification of polyvinyl alcohols contained in the high refractive index layer and an average degree of saponification of polyvinyl alcohols contained in the low refractive index layer are different from each other.

DESCRIPTION OF EMBODIMENTS

An embodiment of the invention is an optical reflective film which includes at least one unit formed by laminating a high refractive index layer and a low refractive index layer on a substrate, wherein at least either of the high refractive index layer or the low refractive index layer contains two or more kinds of polyvinyl alcohols having different degrees of saponification, the high refractive index layer and the low refractive index layer contain polyvinyl alcohols having approximately the same degree of saponification, and the average degree of saponification of the polyvinyl alcohols contained in the high refractive index layer and the average degree of saponification of the polyvinyl alcohols contained in the low refractive index layer are different from each other. According to such an embodiment, the productivity is high and the optical reflective film is excellent in light reflection property at the desired wavelength. In addition, according to the configuration of the invention, the optical reflective film is excellent in the light reflection characteristic and the adhesiveness between the adjacent layers is secured. The optical reflective film is frequently disposed in the environment exposed to a temperature change of one year under the outdoor air and thus is required to maintain the function as a film even under high temperature and low temperature conditions. The optical reflective film of the invention exhibits favorable film characteristics (reflection characteristic and the like) and adhesiveness even under the condition of severe temperature change. Furthermore, according to the configuration of the invention, the water-based coating is possible, and thus the optical reflective film is excellent in environmental conservation property at the time of manufacture and can be applied to the simultaneous multilayer coating exhibiting high productivity.

The mechanism of exerting the effects by the configuration of the invention described above is presumed as follows.

That is, the optical reflective film, which is a subject of the present invention, is generally produced by using respective coating solutions capable of forming a high refractive index layer and a low refractive index layer and laminating the high refractive index layer and the low refractive index layer by sequential coating or simultaneous multilayer coating of each of the coating solutions. However, the coating film obtained by the multilayer coating is prone to cause the mixing between the adjacent layers and the disturbance (unevenness) at interface. In the case of sequential multilayer coating, on coating with a coating solution of an upper layer, a formed lower layer is re-dissolved, the liquid between the upper layer and the lower layer are mixed and mixing between adjacent layers and interfacial disorder (unevenness) may occur. In addition, the mixing between the adjacent layers and the disturbance (unevenness) at interface are more likely to occur in the coating film obtained by the simultaneous multilayer coating since the coating film is superimposed in the undried liquid state. It is required to control the interlaminar mixing at an appropriate level since a decrease in reflectance occurs in the multilayer film such as an optical reflective film, which is not preferable, when the interlaminar mixing is too significant.

In contrast, the reflection characteristic is improved by adopting the above configuration in the optical reflective film according to the invention. Such an effect is considered to be the result of suppressing the interlaminar mixing. It is assumed that the interlaminar mixing is suppressed and the disturbance at interface is reduced by the use of polyvinyl alcohol resins having different degrees of saponification since the phase separation of the polyvinyl alcohol resins having different degrees of saponification occurs when water that is the solvent is volatilized in the drying process so as to concentrate the coating liquid and a force to minimize the area at the interface of each layer works even if the layers are slightly mixed with each other when the high refractive index layer and the low refractive index layer are superimposed in the undried liquid state. The optical reflective film of the invention is excellent in light reflection property at the desired wavelength as the interlaminar mixing is suppressed and the disturbance at interface is reduced in this manner. In addition, it is considered that the haze of the film also decreases since the interlaminar mixing is suppressed.

On the other hand, the optical reflective film is often bent at the time of pasting the film to a base structure, and thus it is important that the film layers are not peeled off from each other at the time of being bent or during the time-dependent change after pasting. Hence, the optical reflective film is required to have high adhesiveness between layers. In a case in which the polyvinyl alcohols having the same degree of saponification is used in the adjacent refractive index layers as described in WO 2012/014607A above, the adhesiveness between layers is high but the adhesiveness between layers deteriorates under a severe temperature change condition in some case. On the other hand, the conventional film coating liquid is not satisfactory from the viewpoint of interlaminar separation at the time of multilayer coating, and there is room for improvement in the reflection characteristic because of this. In the invention, the high refractive index layer and the low refractive index layer contain polyvinyl alcohols having approximately the same degree of saponification, and the average degrees of saponification of the polyvinyl alcohols contained in the high refractive index layer and the low refractive index layer are different from each other, and thus it is considered that both the adhesiveness between layers and the reflection characteristic are excellent.

However, the mechanism described above is an assumption and does not limit the scope of the invention in any way.

It is assumed that it is possible to further enhance the reflection characteristic when metal oxide particles are added to at least either of the high refractive index layer or the low refractive index layer since the metal oxide particles bond with the polyvinyl alcohol and the metal oxide particles also move together with the polyvinyl alcohol resins having different degrees of saponification at the time of phase separation thereof.

Hereinafter, the best mode for carrying out the invention will be described in detail.

[Polyvinyl Alcohol]

In the optical reflective film of the invention, the high refractive index layer and the low refractive index layer contain a polyvinyl alcohol. Moreover, the optical reflective film of the invention is furnished with three requirements that (1) at least either of the high refractive index layer or the low refractive index layer contains two or more kinds of polyvinyl alcohols having different degrees of saponification, (2) the high refractive index layer and the low refractive index layer contain polyvinyl alcohols having approximately the same degree of saponification, and (3) the average degree of saponification of the polyvinyl alcohols contained in the high refractive index layer and the average degree of saponification of the polyvinyl alcohols contained in the low refractive index layer are different from each other. Here, the degree of saponification is the proportion of the hydroxyl group to the total number of the acetyloxy group (derived from vinyl acetate of the raw material) and the hydroxyl group in the polyvinyl alcohol.

In (1) above, the high refractive index layer and/or the low refractive index layer contain two or more kinds of polyvinyl alcohols having different degrees of saponification. In order to simultaneously satisfy (2) and (3) above, (1) is the necessary condition. Here, the term "two or more kinds" refers to the kind of polyvinyl alcohol which is divided from the viewpoint of the degree of saponification of polyvinyl alcohol but does not take the degree of polymerization and the presence or absence of modification into consideration. The upper limit of the kinds of the polyvinyl alcohols having different degrees of saponification contained in the high refractive index layer and/or the low refractive index layer is not particularly limited but is usually 10 or fewer kinds from the viewpoint of productivity.

The "polyvinyl alcohols having approximately the same degree of saponification" (hereinafter, also simply referred to as the same polyvinyl alcohol) in (2) above refers to the "polyvinyl alcohols having a difference in degree of saponification within 3 mol %". In other words, the difference between the degree of saponification of any one kind of the polyvinyl alcohols contained in the low refractive index layer and the degree of saponification of any one kind of the polyvinyl alcohols contained in the high refractive index layer is within 3 mol %. There may be two or more pairs of polyvinyl alcohols having the same degree of saponification in a case in which both the high refractive index layer and the low refractive index layer contain a plurality of polyvinyl alcohols.

The content of the same polyvinyl alcohol is preferably 10% by mass or more and more preferably 20% by mass or more with respect to the total amount of the polyvinyl alcohols contained in each refractive index layer in terms of solid content from the viewpoint of improvement in adhesiveness between layers. The content of the same polyvinyl alcohol mentioned herein refers to the total amount of the content of each polyvinyl alcohol of the polyvinyl alcohols having the same degree of saponification of each pair in the refractive index layer in a case in which there are two or more pairs of the same polyvinyl alcohols.

In addition, the content of the same polyvinyl alcohol in both the high refractive index layer and the low refractive index layer is preferably 10% by mass or more and more preferably 20% by mass or more with respect to the total amount of the polyvinyl alcohols contained in each refractive index layer in terms of solid content.

For example, in a case in which the low refractive index layer contains two kinds of polyvinyl alcohols having a degree of saponification of 95 mol % and 75 mol % in the refractive index layer at 50% by mass and 50% by mass, respectively, and the high refractive index layer contains four kinds of polyvinyl alcohols having a degree of saponification of 99.5 mol %, 93 mol %, 85 mol % and 78 mol % in the refractive index layer at 40% by mass, 10% by mass, 40% by mass and 10% by mass, respectively, the polyvinyl alcohol having a degree of saponification of 95 mol % in the low refractive index layer and the polyvinyl alcohol having a degree of saponification of 93 mol % in the high refractive index layer are the same polyvinyl alcohol, and the polyvinyl alcohol having a degree of saponification of 75 mol % in the low refractive index layer and the polyvinyl alcohol having a degree of saponification of 78 mol % in the high refractive index layer are another the same polyvinyl alcohol. In other words, there are two pairs of polyvinyl alcohols having the same degree of saponification in the above film. Here, the content of the same polyvinyl alcohol is the total amount of the content of each polyvinyl alcohol in each refractive index layer, and thus the content of the same polyvinyl alcohol is 100% by mass with respect to the total amount of the polyvinyl alcohols in the low refractive index layer, and the content of the same polyvinyl alcohol is 20% by mass with respect to the total amount of the polyvinyl alcohols in the high refractive index layer.

Also, in a case in which there are two or more pairs of the same polyvinyl alcohols, the content of the same polyvinyl alcohol of all pairs in the refractive index layer is more preferably 10% by mass or more with respect to the total amount of the polyvinyl alcohols contained in each refractive index layer in terms of solid content.

The average degree of saponification in (3) above is determined in consideration of the mass ratio of the polyvinyl alcohol contained in the refractive index layer. In other words, it is average degree of saponification=$\Sigma$(degree of saponification of each polyvinyl alcohol (mol %)×contained mass of each polyvinyl alcohol (%)/100% by mass). For example, in a case in which the refractive index layer contains polyvinyl alcohol A (mass ratio contained in the refractive index layer: Wa, degree of saponification: Sa (mol %)), polyvinyl alcohol B (mass ratio contained in the refractive index layer: Wb, degree of saponification: Sb (mol %)), and polyvinyl alcohol C (mass ratio contained in the refractive index layer: Wc, degree of saponification: Sc (mol %)), the average degree of saponification is as follows; average degree of saponification=(Wa×Sa+Wb×Sb+Wc×Sc)/(Wa+Wb+Wc). Here, the average degree of saponification is expressed as the value to the first decimal place obtained by rounding to the second decimal place.

The difference (absolute value) between the average degree of saponification of the polyvinyl alcohols contained in the high refractive index layer and the average degree of saponification of the polyvinyl alcohols contained in the low refractive index layer is preferably 3 mol % or more, more preferably 5 mol % or more, and even more preferably 8 mol % or more. In such a range, the effect of the invention is further enhanced, and the film characteristics (reflection characteristic, and visible light transmittance and the like in the case of the infrared shielding film) are further improved. It is more preferable as the difference between the average degree of saponification of the polyvinyl alcohols contained in the high refractive index layer and the average degree of saponification of the polyvinyl alcohols contained in the low refractive index layer is greater, but the difference is preferably 20 mol % or less from the viewpoint of solubility of the polyvinyl alcohol in water.

It is preferable that one of the average degree of saponification of the polyvinyl alcohols contained in the high refractive index layer and the average degree of saponification of the polyvinyl alcohols contained in the low refractive index layer be 90 mol % or more and the other be 75 mol % or more and 90 mol % or less. It is preferable that one of the average degree of saponification of the polyvinyl alcohols contained in the high refractive index layer and the average degree of saponification of the polyvinyl alcohols contained in the low refractive index layer be 90 mol % or more and the other be 90 mol % or less since the interlaminar mixing state between the high refractive index layer and the low refractive index layer is at a more preferred level and thus the reflectance at a specific wavelength is improved. The average degree of saponification of the polyvinyl alcohols is preferably 75 mol % or more from the viewpoint of solubility in water. Meanwhile, the upper limit of the degree of saponification of the polyvinyl alcohol is not particularly limited but is usually 100 mol % or less and about 99.9 mol % or less.

In addition, the average degree of saponification of the polyvinyl alcohols contained in the high refractive index layer is preferably higher than the average degree of saponification of the polyvinyl alcohols contained in the low refractive index layer. It is preferable to adopt such a configuration since the interlaminar mixing state between the high refractive index layer and the low refractive index layer is at a more preferred level and thus the reflectance at a specific wavelength is improved.

The polyvinyl alcohols contained in the low refractive index layer preferably have an average degree of saponification of 75 mol % or more and 90 mol % or less. It is preferable to contain such a polyvinyl alcohol in the low refractive index layer from the viewpoint of further suppressing the interface mixing. It is considered that this is because the cracking of the coating film is reduced and set property is improved. From such a viewpoint, a suitable embodiment of the invention is that the average degree of saponification of the polyvinyl alcohols contained in the high refractive index layer is 90 mol % or more and the average degree of saponification of the polyvinyl alcohols contained in the low refractive index layer is 75 mol % or more and 90 mol % or less.

The degree of polymerization of the polyvinyl alcohol used in each refractive index layer is not particularly limited, but the degree of polymerization is preferably 5,000 or less. It is preferable that the degree of polymerization be 5,000 or less since handling property is favorable and working efficiency is improved. The lower limit of the degree of polymerization is not particularly limited but is usually 300 or more.

Here, the degree of polymerization refers to the viscosity average degree of polymerization, is measured in conformity with JIS-K6726 (1994), and is determined by the following Equation from the intrinsic viscosity [η] (dl/g) measured in water at 30° C. after completely saponifying PVA again and purifying.

$$P=([\eta]\times10^3/8.29)^{(1/0.62)}$$ [Mathematical formula 1]

It is preferable to contain the polyvinyl alcohol to be contained in each refractive index layer preferably at 5.0% by mass or more with respect to the total mass (solid content) of each refractive index layer. The effect that the interlaminar mixing is suppressed and the disturbance at interface is reduced, which is the effect of the invention, is remarkably exerted when the content is 5.0% by mass or more. In addition, the polyvinyl alcohol contained in each refractive index layer is preferably 50% by mass or less and more preferably 40% by mass or less with respect to the total mass (solid content) of each refractive index layer in a case in which the refractive index layer contains a metal oxide. When the content is 50% by mass or less, the relative content of the metal oxide is adequate and it is easy to increase the difference in refractive index between the high refractive index layer and the low refractive index layer.

The polyvinyl alcohol also includes a modified polyvinyl alcohol which is partially modified in addition to an ordinary polyvinyl alcohol (unmodified polyvinyl alcohol) obtained by hydrolyzing polyvinyl acetate in the case of being simply referred to as the "polyvinyl alcohol" in the present specification. The polyvinyl alcohol is preferably a water-soluble polyvinyl alcohol. This is because it is possible to prepare a stable coating liquid by the use of a water-soluble polyvinyl alcohol. Meanwhile, the "water-soluble" polyvinyl alcohol in the present specification refers to a compound that dissolves in a water medium by 1% by mass or more and preferably 3% by mass or more.

The unmodified polyvinyl alcohol may be synthesized or a commercially available product may be used. In the latter case, KURARAY POVAL PVA-series (manufactured by KURARAY CO., LTD.), J-POVAL J series (manufactured by JAPAN VAM & POVAL CO., LTD.) and the like can be used.

Examples of the modified polyvinyl alcohol may include a cationically modified polyvinyl alcohol, an anionically modified polyvinyl alcohol, a nonionically modified polyvinyl alcohol and a vinyl alcohol-based polymer. The adhesiveness of the film is further improved in some cases when containing a modified polyvinyl alcohol. The content of the modified polyvinyl alcohol is preferably 0 to 70% by mass in the total polyvinyl alcohols of the refractive index layer.

The cationically modified polyvinyl alcohol is, for example, a polyvinyl alcohol having a first to tertiary amino group or a quaternary ammonium group in the main chain or a side chain of the polyvinyl alcohol described above as described in JP 61-10483 A and is obtained by saponifying a copolymer of an ethylenically unsaturated monomer having a cationic group with vinyl acetate.

Examples of the ethylenically unsaturated monomer having a cationic group may include trimethyl-(2-acrylamido-2,2-dimethylethyl)ammonium chloride, trimethyl-(3-acrylamido-3,3-dimethylpropyl)ammonium chloride, N-vinylimidazole, N-vinyl-2-methylimidazole, N-(3-dimethylaminopropyl)methacrylamide, hydroxylethyltrimethylammonium chloride, trimethyl-(2-methacrylamidopropyl) ammonium chloride and N-(1,1-dimethyl-3-dimethylaminopropyl)acrylamide. The ratio of the cationically modified group-containing monomer in the cationically modified polyvinyl alcohol is from 0.1 to 10 mol % and preferably from 0.2 to 5 mol % with respect to vinyl acetate.

Examples of the anionically modified polyvinyl alcohol may include a polyvinyl alcohol having an anionic group as described in JP 1-206088 A, a copolymer of vinyl alcohol with a vinyl compound having a water-soluble group as described in JP 61-237681 A and JP 63-307979 A and a modified polyvinyl alcohol having a water-soluble group as described in JP 7-285265 A.

In addition, examples of the nonionically modified polyvinyl alcohol may include a polyvinyl alcohol derivative obtained by adding a polyalkylene oxide group to a part of vinyl alcohol as described in JP 7-9758 A, a block copolymer of a vinyl compound having a hydrophobic group with vinyl alcohol described in JP 8-25795 A, a silanol-modified polyvinyl alcohol having a silanol group (for example, "R-1130" manufactured by KURARAY CO., LTD.) and a reactive group-modified polyvinyl alcohol having a reactive group such as an acetoacetyl group, a carbonyl group or a carboxyl group (for example, "GOHSEFIMER (registered trademark) Z" manufactured by The Nippon Synthetic Chemical Industry Co., Ltd.).

In addition, examples of the vinyl alcohol-based polymer may include a vinyl acetate-based resin (for example, "EXCEVAL" manufactured by KURARAY CO., LTD.) and Nichigo G-polymer (trade name and manufactured by The Nippon Synthetic Chemical Industry Co., Ltd.).

It is also possible to concurrently use two or more kinds of modified polyvinyl alcohols having different degrees of polymerization or different kinds of modification.

In addition, each refractive index layer may contain a polyvinyl alcohol with a low degree of polymerization and a high degree of saponification in which a degree of polymerization of from 100 to 1000 and more preferably a degree of polymerization of from 100 to 500 and a degree of saponification of 95 mol % or more (hereinafter, simply referred to as the polyvinyl alcohol with a low degree of polymerization and a high degree of saponification) as long as the effect of the invention is not impaired. The stability of the coating liquid is improved when containing such a polyvinyl alcohol with a low degree of polymerization and a high degree of saponification. The content of the polyvinyl alcohol with a low degree of polymerization and a high degree of saponification is not particularly limited but is preferably from 0.5 to 5% by mass with respect to the total mass (solid content) of each refractive index layer. The effect described above is further exerted in such a range. Meanwhile, the upper limit of the degree of saponification of the polyvinyl alcohol with a low degree of polymerization and a high degree of saponification is not particularly limited but is usually less than 100 mol % and about 99.9 mol % or less.

[Curing Agent]

In the invention, it is preferable to use a curing agent. The curing agent that can be used together with a polyvinyl alcohol is not particularly limited as long as it causes a curing reaction with a polyvinyl alcohol, and boric acid and its salts are preferable. It is also possible to use a known curing agent in addition to boric acid and its salts, and the known curing agent is generally a compound having a group obtained by reacting with a polyvinyl alcohol or a compound that promotes the reaction of the different groups belonging to a polyvinyl alcohol and is appropriately selected and used. Specific examples of the curing agent may include an epoxy-based curing agent (diglycidyl ethyl ether, ethylene glycol diglycidyl ether, 1,4-butanediol diglycidyl ether, 1,6-diglycidyl cyclohexane, N,N-diglycidyl-4-glycidyloxy aniline, sorbitol polyglycidyl ether, glycerol polyglycidyl ether and the like), an aldehyde-based curing agent (formaldehyde, glyoxal and the like), an active halogen-based curing agent (2,4-dichloro-4-hydroxy-1,3,5-s-triazine and the like), an active vinyl-based compound (1,3,5-trisacryloyl-hexahydro-s-triazine, bisvinylsulfonyl methyl ether and the like), aluminum alum and borax.

Boric acid or its salts refer to an oxoacid having a boron atom as the central atom and the salts thereof, and specific examples thereof may include orthoboric acid, diboric acid, metaboric acid, tetraboric acid, pentaboric acid and octaboric acid and the salts thereof.

Boric acid and its salts having a boron atom as the curing agent may be used as a single aqueous solution or as a mixture of two or more kinds thereof. An aqueous solution of boric acid or a mixed aqueous solution of boric acid and borax is particularly preferable.

Each of the aqueous solution of boric acid and the aqueous solution of borax only can be added as a relatively dilute aqueous solution, but a concentrated aqueous solution can be prepared by mixing the two, and thus it is possible to concentrate the coating liquid. Moreover, there is an advantage that the pH of the aqueous solution to be added can be relatively freely controlled.

In the invention, it is preferable to use boric acid and its salts and/or borax from the viewpoint of further suppressing the interlaminar mixing. It is considered that the metal oxide particles and the OH group of the polyvinyl alcohol which is a water-soluble polymer forma hydrogen bond network in the case of using boric acid and its salts and/or borax, and as a result, the interlaminar mixing between the high refractive index layer and the low refractive index layer is suppressed and the preferred shielding properties are achieved. It is possible to exert a more preferred effect particularly in the case of using a set-based coating process in which the superposed multilayer of the high refractive index layer and the low refractive index layer is coated with a coater, the film surface temperature of the coating film is then once cooled to about 15° C., and the film surface is then dried.

The total amount of the curing agents used is preferably from 1 to 600 mg per 1 g of polyvinyl alcohol and preferably from 100 to 600 mg per 1 g of polyvinyl alcohol.

[Resin Binder]

In the invention, each refractive index layer indispensably contains a polyvinyl alcohol as the resin binder but may contain another resin binder as well.

The content of the resin binder is not particularly limited but is preferably from 5 to 50% by mass with respect to the total mass (solid content) of each refractive index layer.

In the invention, the binder resin is preferably composed of a water-soluble polymer since it is not required to use an organic solvent, and it is preferable in respect of the environmental conservation. In other words, a water-soluble polymer other than a polyvinyl alcohol may be used as a binder resin in addition to the polyvinyl alcohol described above as long as the effect is not impaired in the invention. The water-soluble polymer of the invention means a water-soluble polymer having a mass of an undissolved substance within 50% by mass of the added water-soluble polymer, which is filtered off when filtered with a G2 glass filter (the maximum pore of 40 to 50 µm) after dissolving the water-soluble polymer in water to have a concentration of 0.5% by mass at a temperature at which the water-soluble polymer is most dissolved. Among such water-soluble polymers, gelatin, celluloses, thickening polysaccharides, and polymers having reactive functional groups are preferred. These water-soluble polymers may be used alone or may be used as a mixture of two or more kinds. Further, as a water-soluble polymer, a synthesized one may be used or a commercially available product may be used.

Hereinafter, these water-soluble polymers will be described.

(Gelatin)

As the gelatin applicable to the invention, it is possible to apply various kinds of gelatin which has been hitherto widely used in silver halide photographic material field, and examples thereof may include enzyme treated gelatin subjected to the enzymatic treatment in the manufacturing process of gelatin and a gelatin derivative, that is, those which have an amino group, an imino group, a hydroxyl group, and a carboxyl group in the molecule as the functional group and have been modified by treating with a reagent having a group capable of reacting with the functional group in addition to acid-treated gelatin and alkali-treated gelatin. A general production method of gelatin has been well known and, for example, descriptions in T. H. James: The Theory of Photographic Process 4th ed. 1977 (Macmillan) page 55, Handbook of Scientific Photography (vol. 1) pages 72 to 75 (Maruzen Company, Limited.), Basics of photographic engineering-Silver salt photography, 119 to 124 (CORONA PUBLISHING CO., LTD.), etc. can be referred to. An example thereof can also include gelatin described in Research Disclosure Magazine, vol. 176, No. 17643 (December 1978) in section IX.

(Gelatin Hardening Agent)

It is also possible to add a gelatin hardening agent if necessary in the case of using gelatin.

As the usable hardening agent, it is possible to use a known compound which is used as a hardening agent for a usual photographic emulsion layer, and examples thereof may include an organic hardening agent such as a vinyl sulfone compound, a urea-formalin condensate, a melanin-formalin condensate, an epoxy-based compound, an aziridine-based compound, an active olefin and an isocyanate-based compound, an inorganic polyvalent metal salt such as chromium, aluminum, and zirconium and the like.

(Cellulose)

As the cellulose usable in the invention, it is possible to preferably use a water-soluble cellulose derivative, and examples thereof may include a water-soluble cellulose derivative such as carboxymethyl cellulose (cellulose carboxymethyl ether), methyl cellulose, hydroxymethyl cellulose, hydroxyethyl cellulose and hydroxypropyl cellulose, and carboxymethyl cellulose (cellulose carboxymethyl ether) and carboxyethyl cellulose which are a kind of carboxylic acid group-containing cellulose.

(Thickening Polysaccharide)

The thickening polysaccharide usable in the invention is not particularly limited, and examples thereof may include a commonly known natural simple polysaccharide, a natural heteropolysaccharide, a synthetic simple polysaccharide and a synthetic heteropolysaccharide. Regarding the details of these polysaccharides, "Biochemistry Encyclopedia (the second edition) published by Tokyo Kagaku Dojin Co., Ltd.", and "Food Industry" Volume 31st (1988) page 21 and the like can be referred to.

A thickening polysaccharide referred in the invention means a polymer of saccharides, which has a large number of hydrogen bonding groups in a molecule and is a polysaccharide provided with characteristics of a large difference between a viscosity at a low temperature and a viscosity at a high temperature due to difference in hydrogen bonding force among molecules by a temperature. The thickening polysaccharide is more preferably a polysaccharide that, when the metal oxide fine particles are added, causes viscosity increase which is supposed to be generated by hydrogen bonds with metal oxide fine particles at a low temperature, and of which the breadth is such that, by addition of the metal oxide fine particles, a viscosity at 15° C. is increased to preferably 1.0 mPa·s or more, and the thickening polysaccharide is a polysaccharide having a viscosity increase ability of more preferably 5.0 mPa·s or more, and further preferably 10.0 mPa·s or more.

Examples of the thickening polysaccharide applicable to the invention may include galactan (for example, agarose and agaropectin), galactomannanoglycan (for example, locust bean gum and guaran), xyloglucan (for example, tamarind gum), glucomannoglycan (for example, konjac mannan, wood-derived glucomannan and xanthan gum), galactoglucomannoglycan (for example, softwood derived glycan), arabinogalactan glycan (for example, soy-derived glycan and microorganism-derived glycan), glucorhamnoglycan (for example, gellan gum), glycosaminoglycan (for example, hyaluronic acid and keratan sulfate), alginic acid and alginate salts, and a natural polymeric polysaccharide derived from red algae such as agar, κ-carrageenan, λ-carrageenan, ι-carrageenan, and furcellaran. It is preferably those of which the constitutional unit does not have a carboxylic acid group or a sulfonic acid group from the viewpoint of not lowering the dispersion stability of the metal oxide fine particles coexisting in the coating liquid. Examples of such a polysaccharide may preferably include a polysaccharide composed of only pentose such as L-arabitosu, D-ribose, 2-deoxyribose and D-xylose and hexose such as D-glucose, D-fructose, D-mannose and D-galactose. Specifically, it is possible to preferably use tamarind seed gum which is known as xyloglucan having a glucose main chain and also a glucose side chain, guar gum, cationized guar gum, hydroxypropyl guar gum, locust bean gum and tara gum which are known as galactomannan having a mannose main chain and a glucose side chain, and arabinogalactan having a galactose main chain and an arabinose side chain. In the invention, tamarind, guar gum, cationized guar gum and hydroxypropyl guar gum are particularly preferable.

In the invention, furthermore, two or more kinds of thickening polysaccharides may be concurrently used.

(Polymer Having Reactive Functional Group)

Examples of the water-soluble polymer applicable to the invention may include a polymer having a reactive functional group, and examples thereof may include a polyvinyl pyrrolidone, an acrylic resin such as polyacrylic acid, an acrylic acid-acrylonitrile copolymer, a potassium acrylate-acrylonitrile copolymer, a vinyl acetate-acrylic acid ester copolymer, or an acrylic acid-acrylic acid ester copolymer, a styrene acrylic acid resin such as styrene-acrylic acid copolymer, a styrene-methacrylic acid copolymer, a styrene-methacrylic acid-acrylic acid ester copolymer, a styrene-α-methylstyrene-acrylic acid copolymer, or a styrene-α-methylstyrene-acrylic acid-acrylic acid ester copolymer, a styrene-sodium styrene sulfonate copolymer, a styrene-2-hydroxyethyl acrylate copolymer, a styrene-2-hydroxyethyl acrylate-potassium styrene sulfonate copolymer, a styrene-maleic acid copolymer, a styrene-anhydrous maleic acid copolymer, a vinyl naphthalene-acrylic acid copolymer, a vinyl naphthalene-maleic acid copolymer, and a vinyl acetate-based copolymer such as a vinyl acetate-maleic acid ester copolymer, a vinyl acetate-crotonic acid copolymer and vinyl acetate-acrylic acid copolymer, and the salts thereof.

A fluorine-containing polymer may be used in the low refractive index layer in order to adjust the difference in refractive index. Examples of the fluorine-containing polymer may include a polymerized substance mainly containing a fluorine-containing ethylenically unsaturated monomer component.

Examples of the fluorine-containing ethylenically unsaturated monomer may include a fluorine-containing alkene, a fluorine-containing acrylic acid ester, a fluorine-containing methacrylic acid ester, a fluorine-containing vinyl ester and a fluorine-containing vinyl ether, and examples thereof may include a fluorine-containing ethylenically unsaturated monomer such as tetrafluoroethylene, trifluoroethylene, trifluorochloroethylene, vinylidene fluoride, vinyl fluoride, trifluoropropylene, heptafluoropropylene, hexafluoropropylene, 2-bromo-3,3,3-trifluoroethylene, 3-bromo-3,3-difluoroethylene, 3,3,4,4,5,5,6,6,6-nonafluoro-1-hexene, 3,3,4,4,5,5,6,6,7,7,8,8,8-tridecafluoro-1-octene, 4-ethoxy-1,1,1-trifluoro-3-butene-2-one, pentadecafluorooctyl acrylate, tetrafluoro-3-(heptafluoropropoxy)propyl acrylate, tetrafluoro-3-(pentafluoroethoxy)propyl acrylate, tetrafluoro-3-trifluoromethoxypropyl acrylate, undecafluorohexyl acrylate, nonafluoropentyl acrylate, octafluoropentyl acrylate, pentafluoropropyl acrylate, 2-heptafluorobutoxyethyl acrylate, 2,2,3,4,4,4-hexafluorobutoxy acrylate, trifluoroethyl acrylate, 2-(1,1,2,2-tetrafluoroethoxyl)ethyl acrylate, trifluoroisopropyl methacrylate, (2,2,2-trifluoro-1-methyl)ethyl methacrylate, 2-trifluoroethoxyethyl acrylate, trifluoroethyl methacrylate, 2-trifluoromethyl-3,3,3-trifluoropropyl acrylate, 3-trifluoromethyl-4,4,4-trifluorobutylacrylate, 1-methyl-2,2,3,3,3-pentafluoropropyl acrylate, 1-methyl-2,2,3,3,4,4,4-heptafluorobutyl acrylate, 2,2,2-trifluoroethylacrylate, 2,2,3,3,3-pentafluoropropyl acrylate, 1,1,1,3,3,3-hexafluoroisopropyl acrylate, 2,2,3,3-tetrafluoropropyl acrylate, 2,2,2-trifluoroethyl methacrylate, 2,2,3,3,4,4,4-heptafluorobutyl acrylate, 2,2,3,3,4,4,5,5,5-nonafluoropentyl acrylate, 2,2,3,3,4,4,5,5,6,6,6-undecafluorohexyl acrylate, 2,2,3,3,4,4,5,5,6,6,7,7,7-tridecafluoroheptyl acrylate, 2,2,3,3,4,4,5,5,6,6,7,7,8,8,8-pentadecafluorooctyl acrylate, 3,3,4,4,5,5,6,6,7,7,8,8,8-tridecafluorooctyl acrylate, 2,2,3,3,4,4,5,5,6,6,7,7,8,8,9,9,10,10,10-nonadecafluorod ecyl acrylate, 3,3,4,4,5,5,6,6,7,7,8,8,9,9,10,10,10-heptadecafluorodecy acrylate, 1,1,1,3,3,3-hexafluoroisopropyl acrylate, 2,2,3,3-tetrafluoropropyl acrylate, 2,2,3,3,4,4,4-hexafluorobutyl acrylate (the acrylates described above may be methacrylates or α-fluoroacrylates), vinyl trifluoroacetate, vinyl-2,2,2-trifluoropropionate, vinyl-3,3,3,2,2-heptabutyrate, 2,2,2-trifluoroethyl vinyl ether, 1-(trifluoromethyl)ethenyl acetate, allyl trifluoroacetate, allyl-1,1,2,2-tetrafluoroethyl ether, allyl-1,2,3,3,3-hexafluoropropyl ether, ethyl-4,4,4-trifluorocrotonate, isopropyl-2,2,2-trifluoroethyl fumarate, isopropyl-2,2,2,3,3,3-pentafluoropropyl fumarate, isopropyl-2,2,3,3,4,4,4-heptafluorobutyl fumarate, isopropyl-2,2,3,3,4,4,5, 5,5-nonapropylpentyl fumarate, isopropyl-2,2,3,3,4,4,5,5,6, 6,6-undecafluorohexyl fumarate, isopropyl-2,2,3,3,4,4,5,5, 6,6,7,7,7-tridecafluoroheptyl fumarate, isopropyl-2,2,3,3,4, 4,5,5,6,6,7,7,8,8,8-pentadecafluorooctyl fumarate, isopropyl-3,3,4,4,5,5,6,6,7,7,8,8,8-tridecafluorooctyl fumarate, isopropyl-2,2,3,3,4,4,5,5,6,6,7,7,8,8,9,9,10,10,10-nonadecafluorodecyl fumarate, isopropyl-3,3,4,4,5,5,6,6,7,7,8,8,9,9,10,10,10-heptadecafluorodecyl fumarate, isopropyl-2-trifluoromethyl-3,3,3-trifluoropropyl fumarate, isopropyl-3-trifluoromethyl-4,4,4-trifluorobutyl fumarate, isopropyl-1-methyl-2,2,3,3,3-pentafluoropropyl fumarate, isopropyl-1-methyl-2,2,3,3,4,4,4-heptafluorooctyl fumarate, tert-butyl-2,2,3,3,3-pentylfluoropropylfumarate, tert-butyl-2,2,3,3,4,4,4-heptafluorobutyl fumarate, tert-butyl-2,2,3,3,4, 4,5,5,5-nonafluoropentyl fumarate, tert-butyl-2,2,3,3,4,4,5, 5,6,6,6-undecafluorohexyl fumarate, tert-butyl-2,2,3,3,4,4, 5,5,6,6,7,7,7-tridecafluoroheptyl fumarate, tert-butyl-2,2,3, 3,4,4,5,5,6,6,7,7,8,8,8-pentadecafluoro octyl fumarate, tert-butyl-3,3,4,4,5,5,6,6,7,7,8,8,8-tridecafluorooctyl fumarate, tert-butyl-2,2,3,3,4,4,5,5,6,6,7,7,8,8,9,9,10,10,10-nonadecafluorodecyl fumarate, tert-butyl-3,3,4,4,5,5,6,6,7,7,8,8, 9,9,10,10,10-heptadecafluorodecyl fumarate, tert-butyl-2-trifluoromethyl-3,3,3-trifluoropropyl fumarate, tert-butyl-3-trifluoromethyl-4,4,4-trifluorobutyl fumarate, tert-butyl-1-methyl-2,2,3,3,3-pentylfluoropropyl fumarate and tert-butyl-1-methyl-2,2,3,3,4,4,4-heptafluorobutyl fumarate.

Examples of the monomer which can be copolymerized with the fluorine-containing monomer may include ethylene, propylene, butene, vinyl acetate, vinyl ethyl ether, vinyl ethyl ketone, methyl acrylate, methyl methacrylate, ethyl acrylate, propyl acrylate, butyl acrylate, ethyl methacrylate, propyl methacrylate, butyl methacrylate, methyl-α-fluoroacrylate, ethyl-α-fluoroacrylate, propyl-α-fluoroacrylate, butyl-α-fluoroacrylate, cyclohexyl-α-fluoroacrylate, hexyl-α-fluoroacrylate, benzyl-α-fluoroacrylate, acrylic acid, methacrylic acid, α-fluoroacrylic acid, styrene, styrene sulfonic acid and methoxy polyethylene glycol methacrylate.

The refractive index of a single resin of the fluorine-containing ethylenically unsaturated monomer is approximately in the range of from 1.33 to 1.42, or the refractive index of a single resin polymer of the monomer which can be copolymerized but does not contain fluorine is 1.44 or more. It is possible to copolymerize these at an arbitrary proportion and to use as a fluorine-containing polymer having the desired refractive index and it is possible to mix the fluorine-containing polymer with the polyvinyl alcohol described above at an arbitrary proportion and to use as one having the desired refractive index. The mass ratio (in terms of solid content) of such a fluorine-containing polymer to the polyvinyl alcohol contained in the refractive index layer is suitably polyvinyl alcohol fluorine-containing polymer=1: 0.1 to 5.

[Metal Oxide]

It is preferable that at least either of the high refractive index layer or the low refractive index layer further contain metal oxide particles. The reflection characteristic is improved and also the effect of the invention of suppressing the interfacial mixing is further exerted and thus the reflection characteristic is further improved by containing the metal oxide particles. It is more preferable that both the high refractive index layer and the low refractive index layer contain the metal oxide particles.

(Metal Oxide in Low Refractive Index Layer)

It is preferable to use silica (silicon dioxide) as the metal oxide in the low refractive index layer, and specific examples thereof may include synthetic amorphous silica and colloidal silica. Between these, it is more preferable to use an acidic colloidal silica sol and particularly preferable to use colloidal silica dispersed in an organic solvent. In addition, in order to further reduce the refractive index, hollow fine particles having pores inside of the particles may be used as the metal oxide fine particles of the low refractive index layer, and hollow fine particles of silica (silicon dioxide) is particularly preferable. Moreover, it is also possible to use known metal oxide particles other than silica.

The metal oxide particles (preferably silicon dioxide) contained in the low refractive index layer preferably has an average particle size of from 3 to 100 nm. The average particle size of the primary particles of silicon dioxide dispersed in a primary particle state (the particle size in a dispersion state before coating) is more preferably from 3 to 50 nm, even more preferably from 3 to 40 nm, particularly preferably from 3 to 20 nm, and most preferably from 4 to 10 nm. In addition, the average particle size of the secondary particles is preferably 30 nm or less from the viewpoint of a low haze and excellent visible light transmission property.

In the present specification, the average primary particle size can be measured from an electron micrograph by a transmission electron microscope (TEM) and the like. The particle size may be measured by a particle size distribution meter which utilizes a dynamic light scattering method or a static light scattering method.

In the case of determining using a transmission electron microscope, the average primary particle size of the particles is determined as a simple average value (number average) by observing the particles themselves or the particles appearing on the cross section or surface of the refractive index layer using an electron microscope and measuring the particle size of 1000 arbitrary particles. Here, the particle size of the individual particles is expressed as the diameter when assuming a circle equal to the projected area thereof.

The particle size of the metal oxide particles of the low refractive index layer can also be determined by the volume average particle size in addition to the average primary particle size.

The colloidal silica used in the invention is those obtained by heating and aging the silica sol obtained by the double decomposition of sodium silicate by an acid or the like or by passing through an ion exchange resin layer, and examples thereof may include those described in JP 57-14091 A, JP 60-219083 A, JP 60-219084 A, JP 61-20792 A, JP 61-188183 A, JP 63-17807 A, JP 4-93284 A, JP 5-278324 A, JP 6-92011 A, JP 6-183134 A, JP 6-297830 A, JP 7-81214 A, JP 7-101142 A, JP 7-179029 A, JP 7-137431 A and WO 94/26530 A.

A synthetic product or a commercially available product may be used as such colloidal silica.

The colloidal silica may be those of which the surface is cationically modified or treated with Al, Ca, Mg or Ba.

In addition, it is possible to use hollow particles as the metal oxide particles of the low refractive index layer. In the case of using the hollow fine particles, the average particle pore size thereof is preferably from 3 to 70 nm, more preferably from 5 to 50 nm, and even more preferably from 5 to 45 nm. Meanwhile, the average particle pore size of the hollow fine particles is the average value of the inner diameters of the hollow fine particles. The refractive index of the low refractive index layer is sufficiently lowered when the average particle pore size of the hollow fine particles is in the range described above. The average particle pore size is obtained as follows. The pore diameters of 50 particles or more which can be observed as a circle, an ellipse, or a substantially circle or a substantially ellipse are randomly observed using an electron microscope, the pore diameter of each particle is determined, and the number average thereof is then determined. Meanwhile, the average particle pore size means the minimum distance among the distances determined by putting the outer edge of the pore diameter that can be observed as a circle, an ellipse, or a substantially circle or a substantially ellipse between two parallel lines.

The content of the metal oxide particles in the low refractive index layer is preferably 20 to 90% by mass, more preferably from 30 to 85% by mass, and even more preferably from 40 to 70% by mass with respect to 100% by mass of the solid content of the low refractive index layer. It is preferable that the content be 20% by mass or more since the desired refractive index is obtained and the content be 90% by mass or less since the coating property is favorable.

(Metal Oxide of High Refractive Index Layer)

Examples of the metal oxide particles of the high refractive index layer according to the invention may include titanium dioxide, zirconium oxide, zinc oxide, alumina, colloidal alumina, lead titanate, red lead, chrome yellow, zinc yellow, chromium oxide, ferric oxide, iron black, copper oxide, magnesium oxide, magnesium hydroxide, strontium titanate, yttrium oxide, niobium oxide, europium oxide, lanthanum oxide, zircon and tin oxide.

In the invention, it is preferable that the high refractive index layer contain metal oxide fine particles having a high refractive index such as titanium and zirconia, that is, titanium oxide fine particles and zirconium oxide fine particles in order to forma high refractive index layer which is transparent and has a higher refractive index. In that case, it is preferable to contain rutile type (tetragonal system) titanium oxide particles having a volume average particle size of 100 nm or less.

As the titanium oxide particles of the invention, it is preferable to use those obtained by modifying the surface of water-based titanium oxide sol to stabilize the dispersion state.

As the method of preparing the water-based titanium oxide sol, it is possible to use any methods known in the related art, and, for example, it is possible to see the matters described in JP 63-17221 A, JP 7-819 A, JP 9-165218 A, JP 11-43327 A, JP 63-17221 A, JP 7-819 A, JP 9-165218 A and JP 11-43327 A.

In addition, regarding other preparation methods of titanium oxide particle, for example, "Titanium Oxide-Physical Properties And Application Techniques" by Manabu Seino, pp 255 to 258 (2000) GIHODO SHUPPAN Co., Ltd. and the method of step (2) described in paragraphs from 0011 to 0023 in the pamphlet of WO 2007/039953 can be referred to.

The production method in step (2) described above includes step (1) of treating titanium dioxide hydrate with at least one basic compound selected from the group consisting of hydroxides of alkali metals or hydroxides of alkali earth metals and step (2) of treating the obtained titanium dioxide dispersion with a carboxylic acid group-containing compound and an inorganic acid after step (1).

Furthermore, as another method of producing metal oxide particles including titanium oxide particles, it is possible to see the matters described in JP 2000-053421 A (a titanium oxide sol in which alkyl silicate is blended as a dispersion stabilizer and the mass ratio ($SiO_2/TiO_2$) of the amount of silicon in the alkyl silicate in terms of $SiO_2$ to the amount of titanium in the titanium oxide in terms of $TiO_2$ is from 0.7 to 10), JP 2000-063119 A (a sol obtained by covering the surface of composite colloidal particles of $TiO_2$—$ZrO_2$—$SnO_2$ as the core with composite oxide colloidal particles of $WO_3$—$SnO_2$—$SiO_2$) and the like.

Furthermore, titanium oxide particles may also be coated with silicon-containing hydrous oxide. Herein, "coat" means such a state that silicon-containing hydrous oxide is attached to at least a part of surfaces of titanium oxide particles. That is, surfaces of titanium oxide particle used as metal oxide particles may be completely coated with silicon-containing hydrous oxide or a part of surfaces of titanium oxide particle may be coated with silicon-containing hydrous oxide. It is preferred that a part of surfaces of titanium oxide particle be coated with silicon-containing hydrous oxide from the viewpoint that the refractive index of the coated titanium oxide particle is controlled by the coating amount of the silicon-containing hydrous oxide.

Titanium oxide of the titanium oxide particles coated with a silicon-containing hydrous oxide may be a rutile type or an anatase type. The titanium oxide particles coated with a silicon-containing hydrous oxide are more preferably rutile type titanium oxide particles coated with a silicon-containing hydrous oxide. This is because of the reason that the rutile type titanium oxide particles have lower photocatalytic activity than the anatase type titanium oxide particles and thus the weather resistance of the high refractive index layer and the adjacent low refractive index layer is enhanced and further the refractive index increases.

The "silicon-containing hydrous oxide" in the present specification may be any of a hydrate of an inorganic silicon compound, and a hydrolysate and/or condensate of an organic silicon compound, but more preferably it has a silanol group in order to obtain the effect of the invention.

The covering amount of the silicon-containing hydrous oxide is from 3 to 30% by mass, preferably from 3 to 10% by mass, and more preferably from 3 to 8% by mass. This is because the high refractive index layer can obtain the desired refractive index when the covering amount is 30% by mass or less and the particles can be stably formed when the covering amount is 3% or more.

As the method of coating the titanium oxide particles with a silicon-containing hydrous oxide, it can be produced by a method known in the related art, and, for example, it is possible to see the matters described in JP 10-158015 A (Si/Al hydrous oxide treatment for rutile type titanium oxide; the method of producing a titanium oxide sol to perform the surface treatment by depositing a hydrous oxide of silicon and/or aluminum on the surface of titanium oxide after the peptization of titanic acid cake in an alkaline region), JP 2000-204301 A (a sol obtained by coating rutile type titanium oxide with a composite oxide of Si and an oxide of Zr and/or Al. hydrothermal treatment.), JP 2007-246351 A (a method of producing titanium oxide hydrosol coated with hydrous oxide of silicon including adding an organoalkoxysilane represented by Formula $R^1{}_n SiX_{4-n}$ (in Formula, $R^1$ is a $C_1$-$C_8$ alkyl group, a glycidyl oxy-substituted $C_1$-$C_8$ alkyl group or a $C_2$-$C_8$ alkenyl group, X is an alkoxy group, n is 1 or 2.) as a stabilizer or a compound exhibiting a complexing action with respect to titanium oxide to the hydrosol of titanium oxide obtained by the peptization of hydrous titanium oxide, adding the resultant to a solution of sodium silicate or a silica sol in an alkaline region and subjecting the resultant to the pH adjustment and aging) and the like.

The metal oxide particles used in the high refractive index layer can be determined by the volume average particle size or the average primary particle size. The volume average particle size of the metal oxide particles used in the high refractive index layer is preferably 30 nm or less, more preferably from 1 to 30 nm, and even more preferably from 5 to 15 nm. It is preferable that the volume average particle size be 30 nm or less from the viewpoint of a low haze and excellent visible light transmission property. Here, the above average primary particle size indicates the average primary particle size of the titanium oxide particles (not coated with a silicon-containing hydrous oxide) in the case of the above titanium oxide particles coated with a silicon-containing hydrous oxide. In addition, the average primary particle size of the metal oxide particles used in the metal oxide particles used in the high refractive index layer is preferably 30 nm or less, more preferably from 1 to 30 nm, and even more preferably from 5 to 15 nm. It is preferable that the average primary particle size be 1 nm or more and 30 nm or less from the viewpoint of a low haze and excellent visible light transmission property.

In terms of the volume average particle diameter referred in the present specification, particle diameters of any 1,000 particles are measured by a method of observing particles themselves with a laser diffraction-scattering method, a dynamic light scattering method, or an electron microscope or a method of observing a particle image that appears in a cross-sectional surface or a surface of a refractive index layer by an electron microscope, and when a volume per one particle is assumed to be vi, an average particle diameter weighted by a volume, which is expressed by a volume average particle diameter $mv=\{\Sigma(vi \cdot di)\}/\{\Sigma(vi)\}$, is calculated in a group of metal oxide particles in which particles each having a particle diameter of d1, d2 ... di ... dk are present respectively in the number of n1, n2 ... ni ... nk.

Furthermore, the metal oxide particles used in the invention is preferably monodispersed. Here, the term "monodispersed" refers to that the monodispersity determined by the following Equation is 40% or less. This monodispersity is more preferably 30% or less and particularly preferably from 0.1 to 20%.

Monodispersity=(standard deviation of particle size)/
(average value of particle size)×100. [Mathematical formula 2]

The content of the metal oxide particles in the high refractive index layer is preferably from 15 to 90% by mass, more preferably from 20 to 85% by mass, and even more preferably from 30 to 85% by mass with respect to 100% by mass of the solid content of the high refractive index layer from the viewpoint of improving the reflectance.

[Surfactant]

It is preferable that each refractive index layer contain a surfactant from the viewpoint of coating property.

It is possible to use an anionic surfactant, a nonionic surfactant, an amphoteric surfactant and the like as the surfactant used to adjust the surface tension at the time of coating, and an anionic surfactant is more preferable. Examples of the preferred compound may include those containing a hydrophobic group having from 8 to 30 carbon atoms and a sulfonic acid group or a salt thereof in one molecule.

As the anionic surfactant, it is possible to use a surfactant selected from the group consisting of an alkylbenzene sulfonate salt, an alkyl naphthalene sulfonate salt, an alkane or olefin sulfonate salt, an alkyl sulfuric acid ester salt, a polyoxyethylene alkyl or alkylaryl ether sulfuric acid ester salt, an alkyl phosphate salt, an alkyl diphenyl ether disulfonate salt, an ether carboxylate, an alkyl sulfosuccinic acid ester salt, an α-sulfo fatty acid ester and a fatty acid salt, and a condensate of a higher fatty acid and an amino acid and a naphthenate salt. The preferably usable anionic surfactant is a surfactant selected from the group consisting of an alkylbenzene sulfonate salt (especially, those having a straight chain alkyl), an alkane or olefin sulfonate salt (especially, secondary alkane sulfonate salt, an α-olefin sulfonate salt), an alkyl sulfuric acid ester salt, a polyoxyethylene alkyl or alkylaryl ether sulfuric acid ester salt (especially, polyoxyethylene alkyl ether sulfuric acid ester salt), an alkyl phosphate salt (especially, a monoalkyl type), an ether carboxylate, an alkyl sulfosuccinate salt, an α-sulfo fatty acid ester and a fatty acid salt, and an alkyl sulfosuccinate salt is particularly preferable.

The content of the surfactant in each refractive index layer is preferably from 0.001 to 0.5% by weight and more preferably from 0.005 to 0.3% by weight with respect to 100% by mass of the solid content of the refractive index layer.

[Polymeric Dispersant]

It is preferable that each refractive index layer contain a polymeric dispersant from the viewpoint of dispersion stability of the coating liquid. The polymeric dispersant refers to a dispersant which is a polymer having a weight average molecular weight of 10,000 or more. The polymeric dispersant is suitably a polymer having a side chain or a terminal substituted with a hydroxyl group, and examples thereof may include an acrylic polymer such as sodium polyacrylate and polyacrylamide which is copolymerized with 2-ethylhexyl acrylate, a polyether such as polyethylene glycol and polypropylene glycol, and a polyvinyl alcohol. The polymeric dispersant to be used may be a commercially available product, and examples of such a polymeric dispersant may include MALIALIM AKM-0531 (manufactured by NOF CORPORATION). It is preferable that the content of the polymeric dispersant be from 0.1 to 10% by mass with respect to refractive index layer in terms of solid content.

[Emulsion Resin]

The high refractive index layer or the low refractive index layer may further contain an emulsion resin. The flexibility of the film is enhanced and the workability such as the bonding to the glass is improved when containing an emulsion resin.

The emulsion resin is a resin in which fine resin particles, for example, having an average particle size of about from 0.01 to 2.0 μm are dispersed in a water-based medium in an emulsion state, and it can be obtained by the emulsion polymerization of an oil-soluble monomer using a polymeric dispersant having a hydroxyl group. The kind of the dispersant used is not responsible for the fundamental difference in the polymer component of the resulting emulsion resin. Examples of the dispersant used in the polymerization of the emulsion may include a polymeric dispersant such as polyoxyethylene nonylphenyl ether, polyoxyethylene lauryl acid ether, hydroxyethyl cellulose and polyvinyl pyrrolidone in addition to a low molecular dispersant such as an alkyl sulfonate salt, an alkyl benzene sulfonate salt, diethylamine, ethylenediamine and a quaternary ammonium salt. It is assumed that the hydroxyl group is present at least on the surface of fine particles when the emulsion polymerization is performed using a polymeric dispersant having a hydroxyl group, and thus the chemical and physical properties of the emulsion are different from those of the emulsion resin polymerized using another dispersant.

The polymeric dispersant containing a hydroxyl group is a dispersant which is a polymer having a weight average molecular weight of 10,000 or more and those having a side chain or a terminal substituted with a hydroxyl group, and examples thereof may include an acrylic polymer such as sodium polyacrylate and polyacrylamide which is copolymerized with 2-ethylhexyl acrylate, a polyether such as polyethylene glycol and polypropylene glycol, and a polyvinyl alcohol, and a polyvinyl alcohol is particularly preferable.

The polyvinyl alcohol used as the polymeric dispersant includes a modified polyvinyl alcohol such as a cationically modified polyvinyl alcohol, an anionically modified polyvinyl alcohol having an anionic group such as a carboxyl group or a silyl-modified polyvinyl alcohol having a silyl group in addition to a normal polyvinyl alcohol obtained by hydrolyzing polyvinyl acetate. The effect of suppressing the generation of cracks at the time of forming an ink absorbing layer is greater when the average degree of polymerization of the polyvinyl alcohol is higher, the viscosity of the emulsion resin is not high and it is easy to handle at the time of manufacture when the average degree of polymerization is within 5000. Hence, the average degree of polymerization is preferably from 300 to 5000, more preferably from 1500 to 5000, and particularly preferably from 3000 to 4500. The degree of saponification of the polyvinyl alcohol is preferably from 70 to 100 mol % and more preferably from 80 to 99.5 mol %.

Examples of the resin obtained by the emulsion polymerization using the polymeric dispersant described above may include an ethylene-based monomer such as an acrylic acid ester, a methacrylic acid ester, a vinyl-based compound and a styrene-based compound and a homopolymer or copolymer of a diene compound such as butadiene and isoprene, and examples thereof may include an acrylic resin, a styrene-butadiene based resin and an ethylene-vinyl acetate based resin.

[Other Additives of Refractive Index Layer]

It is possible to contain various kinds of additives in the high refractive index layer and the low refractive index layer according to the invention if necessary.

For example, it is possible to contain various kinds of known additives such as an ultraviolet absorber described in JP 57-74193 A, JP 57-87988 A and JP 62-261476 A, an anti-fading agent described in JP 57-74192 A, JP 57-87989 A, JP 60-72785 A, JP 61-146591 A, JP 1-95091 A and JP 3-13376 A, and a fluorescent whitening agent described in JP 59-42993 A, JP 59-52689 A, JP 62-280069 A, JP 61-242871 A and JP 4-219266 A, a pH adjusting agent such as sulfuric acid, phosphoric acid, acetic acid, citric acid, sodium hydroxide, potassium hydroxide and potassium carbonate, an antifoaming agent, a lubricant such as diethylene glycol, a preservative, an antistatic agent and a matting agent.

[Method of Manufacturing Optical Reflective Film]

The method of manufacturing an optical reflective film of the invention is not particularly limited, and it is possible to use any method as long as at least one unit constituted by the high refractive index layer and the low refractive index layer can be formed on a substrate.

In the method of manufacturing an optical reflective film of the invention, the unit constituted by the high refractive index layer and the low refractive index layer is laminated on a substrate to be formed, and specifically, it is preferable to form a laminate by simultaneously multilayer coating the coating liquid for high refractive index layer and the coating liquid for low refractive index layer and then drying. This is because the effect of the invention is further exerted since the interlaminar mixing and the like are more likely to occur in the case of the simultaneous multilayer coating since the layers are superimposed in the undried liquid state as described above. In addition, the effect of the invention is more likely to be exerted in the case of manufacturing the optical reflective film by the simultaneous multilayer coating since the interfacial mixing is likely to occur more seriously in the case of the simultaneous multilayer coating as described above.

As the coating method, for example, a roll coating method, a rod bar coating method, an air knife coating method, a spray coating method, a curtain coating method, or a slide bead coating method to use a hopper and an extrusion coating method described in U.S. Pat. No. 2,761,419 and U.S. Pat. No. 2,761,791 and the like are preferably used.

The solvent used for the preparation of the coating liquid for high refractive index layer and the coating liquid for low refractive index layer is not particularly limited, and water, an organic solvent or a mixed solvent thereof is preferable. In the invention, it is possible to use a water-based solvent since a polyvinyl alcohol is mainly used as the resin binder. The water-based solvent does not require a large scale production facility as compared with the case of using an organic solvent, and thus the water-based solvent is preferable from the viewpoint of productivity as well as the environmental conservation.

Examples of the organic solvent may include an alcohol such as methanol, ethanol, 2-propanol and 1-butanol, an ester such as ethyl acetate, butyl acetate, propylene glycol monomethyl ether acetate and propylene glycol monoethyl ether acetate, an ether such as diethyl ether, propylene glycol monomethyl ether and ethylene glycol monoethyl ether, an amide such as dimethylformamide and N-methylpyrrolidone, and a ketone such as acetone, methyl ethyl ketone, acetylacetone and cyclohexanone. These organic solvents may be used singly or as a mixture of two or more kinds thereof. As the solvent of the coating liquid, particularly water or a mixed solvent of water and methanol, ethanol or ethyl acetate is preferable, and water is more preferable from the viewpoint of the environmental aspect, the convenience of operation and the like.

The content of water in the mixed solvent is preferably from 80 to 99.9% by mass and more preferably from 90 to 99.5% by mass with respect to 100% by mass of the entire mixed solvent when using a mixed solvent of water and a small amount of an organic solvent. Here, this is because it is possible to reduce the volume change due to the volatilization of solvent and the handling is improved when the content is 80% by mass or more and the homogeneity at the time of the liquid addition is enhanced and it is possible to obtain stable liquid properties when the content is 99.9% by mass or less.

The concentration of the resin binder in the coating liquid for high refractive index layer is preferably from 0.5 to 10% by mass. In addition, the concentration of the metal oxide particles in the coating liquid for high refractive index layer is preferably from 1 to 50% by mass.

The concentration of the resin binder in the coating liquid for low refractive index layer is preferably from 0.5 to 10% by mass. In addition, the concentration of the metal oxide particles in the coating liquid for low refractive index layer is preferably from 1 to 50% by mass.

The method of preparing the coating liquid for high refractive index layer and the coating liquid for low refractive index layer is not particularly limited, and examples thereof may include a method in which the metal oxide particles, the resin binder, and other additives that are added if necessary are added and mixed together by stirring. In this case, the addition order of each component is not particularly limited, and each component may be sequentially added and mixed while stirring or the components may be added at a time and mixed together while stirring. The coating liquid having a suitable viscosity is prepared by further using a solvent if necessary.

In the invention, it is preferable to form a high refractive index layer using a water-based coating liquid for high refractive index layer prepared by adding and dispersing rutile type titanium oxide having a volume average particle size of 100 nm or less.

The temperature of the coating liquid for high refractive index layer and the coating liquid for low refractive index layer when performing the simultaneous multilayer coating is preferably in a temperature range of from 25 to 60° C. and more preferably in a temperature range of from 30 to 45° C. in the case of using a slide bead coating method. The temperature is preferably in a temperature range of from 25 to 60° C. and more preferably in a temperature range of from 30 to 45° C. in the case of using a curtain coating method.

The viscosities of the coating liquid for high refractive index layer and the coating liquid for low refractive index layer when performing the simultaneous multilayer coating are not particularly limited. However, the viscosity is preferably in the range of from 5 to 100 mPa·s and even more preferably in the range of from 10 to 50 mPa·s in the preferred temperature range of the coating liquid described above in the case of using a slide bead coating method. In addition, the viscosity is preferably in the range of from 5 to 1200 mPa·s and even more preferably in the range of from 25 to 500 mPa·s in the preferred temperature range of the coating liquid described above in the case of using a curtain coating method. When the viscosity is in such a range, the simultaneous multilayer coating can be effectively performed.

In addition, as the viscosity of the coating liquid at 15° C. is preferably 100 mPa·s or more, more preferably from 100 to 30,000 mPa·s, even more preferably from 3,000 to 30,000 mPa·s, and most preferably from 10,000 to 30,000 mPa·s.

The conditions of the coating and drying method are not particularly limited, and for example, in the case of the sequential coating method, first, either of the coating liquid for high refractive index layer or the coating liquid for low refractive index layer heated at from 30 to 60° C. is coated on a substrate and dried to form a layer and the other coating liquid is coated on this layer and dried to form a laminated film precursor (unit). Next, the layers are laminated by sequentially coating and drying the coating liquids by the method described above as many time as the number of units required to exert the desired shielding performance to obtain a laminated film precursor. It is preferable to dry the formed coating film at 30° C. or higher when drying. For example, it is preferable to dry the formed coating film in a range of a wet-bulb temperature of from 5 to 50° C. and a film surface temperature from 5 to 100° C. (preferably from 10 to 50° C.), and for example, the drying is performed by blowing hot air at from 40 to 60° C. for from 1 to 5 seconds. As the drying method, hot air drying, infrared drying and microwave drying are used. In addition, drying by a multi-stage process is preferred to drying by a single process, and it is more preferable to be the temperature of constant rate section of drying<the temperature of decreasing rate section of drying. In this case, it is preferable that the temperature range of the constant rate section of drying be set to from 30 to 60° C. and the temperature range of the decreasing rate section of drying is set to from 50 to 100° C.

In addition, the conditions of the coating and drying method in the case of performing the simultaneous multi-layer coating is preferably that the coating liquid for high refractive index layer and the coating liquid for low refractive index layer are heated to from 30 to 60° C., the simultaneous multilayer coating of the coating liquid for high refractive index layer and the coating liquid for low refractive index layer on a substrate is performed, thereafter, the temperature of the formed coating film is once cooled (set) to preferably from 1 to 15° C., and drying is then performed at 10° C. or higher. A more preferred drying condition is the condition in the range of a wet-bulb temperature of from 5 to 50° C. and a film surface temperature of from 10 to 50° C. For example, drying is performed by blowing hot air at 80° C. for from 1 to 5 seconds. In addition, as the cooling method immediately after coating, a horizontal set method is preferably performed from the viewpoint of improving the uniformity of the formed coating film.

Here, the term "set" described above means the process in which the viscosity of the coating composition is increased by a means of blowing cold air or the like to the coating film to lower its temperature and the like, and thus the fluidity of the substances between respective layers and in each layer is decreased or the gelation of the substances is caused. The state in which cold air is blown to the surface of the coating film and thus nothing adheres to the finger when the finger is pressed on the surface of the coating film is defined as the completely set state.

The time (set time) from the point at which the coating is completed to the point at which set is completed by blowing cold air is preferably within 5 minutes and more preferably within 2 minutes. The lower limit of the time is not particularly limited, but it is preferable to take 45 seconds or longer. There is a possibility that the mixing of the components in the layer is insufficient when the set time is too short. On the other hand, there is a possibility that the interlayer diffusion of the metal oxide particles proceeds and thus the difference in refractive index between the high refractive index layer and the low refractive index layer is insufficient when the set time is too long. Meanwhile, the process of setting may not be provided when the intermediate layer between the high refractive index layer and the low refractive index layer quickly exhibits high elasticity.

The adjustment of the set time can be performed by adjusting the concentration of the water-soluble resin and the concentration of the metal oxide particles or adding other components such as various kinds of known gelling agents including gelatin, pectin, agar, carrageenan and gellan gum and the like.

The temperature of cold air is preferably from 0 to 25° C. and more preferably from 5 to 10° C. In addition, the time to expose the coating film to cold air is preferably from 10 to 360 seconds, more preferably 10 to 300 seconds, and even more preferably 10 to 120 seconds although it is also dependent on the conveying speed of the coating film.

With regard to the coating thickness of the coating liquid for high refractive index layer and the coating liquid for low refractive index layer, the coating may be performed so as to have a preferred thickness when dried as indicated above.

[Substrate]

As the substrate of the optical reflective film, it is possible to use various kinds of resin films, and it is possible to use a polyolefin film (polyethylene, polypropylene and the like), a polyester film (polyethylene terephthalate, polyethylene naphthalate and the like), polyvinyl chloride, cellulose triacetate and the like, and a polyester film is preferable. The polyester film (hereinafter, referred to as the polyester) is not particularly limited but is preferably a polyester which contains a dicarboxylic acid component and a diol component as the main constituent and has film forming property.

Examples of the dicarboxylic acid component of the main constituent may include terephthalic acid, isophthalic acid, phthalic acid, 2,6-naphthalenedicarboxylic acid, 2,7-naphthalenedicarboxylic acid, diphenylsulfonedicarboxylic acid, diphenyl ether dicarboxylic acid, diphenylethanedicarboxylic acid, cyclohexanedicarboxylic acid, diphenyldicarboxylic acid, diphenyl thioether dicarboxylic acid, diphenyl ketone dicarboxylic acid and phenylindancarboxylic acid. In addition, examples of the diol component may include ethylene glycol, propylene glycol, tetramethylene glycol, cyclohexanedimethanol, 2,2-bis(4-hydroxyphenyl)propane, 2,2-bis(4-hydroxyethoxy-phenyl)propane, bis(4-hydroxyphenyl)sulfone, bisphenol fluorene dihydroxyethyl ether, diethylene glycol, neopentyl glycol, hydroquinone and cyclohexanediol. Among the polyesters having these as the main constituent, a polyester having terephthalic acid or 2,6-naphthalenedicarboxylic acid of the dicarboxylic acid component and ethylene glycol or 1,4-cyclohexanediol of the diol component as the main constituent is preferable from the viewpoint of transparency, mechanical strength, dimensional stability and the like. Among them, a polyester having polyethylene terephthalate or polyethylene naphthalate as the main constituent, a copolymerized polyester composed of terephthalic acid 2,6-naphthalenedicarboxylic acid and ethylene glycol, and a polyester having a mixture of two or more kinds of these polyesters as the main constituent are preferable.

The thickness of the substrate used in the invention is from 10 to 300 μm and more preferably from 20 to 150 μm. In addition, the substrate may be prepared by superimposing two sheets, and the kinds thereof may be the same as or different from each other in this case.

The transmittance of the substrate in visible light region defined by JIS R3106-1998 is preferably 85% or more and particularly preferably 90% or more. It is preferable that the substrate have a transmittance equal to or more than the value described above since it is advantageous in that the transmittance in visible light region defined by JIS R3106-1998 is 50% or more when formed into an infrared shielding film.

In addition, the substrate using the resin described above or the like may be an unstretched film or a stretched film. A stretched film is preferable from the viewpoint of improving the strength and suppressing the thermal expansion.

The substrate can be produced by a general method known in the related art. For example, it is possible to produce an unstretched substrate that is substantially amorphous and not oriented by melting a resin to be the material by an extruder, extruding by a circular die or T-die, and quenching. In addition, it is possible to produce a stretched substrate by stretching the unstretched substrate in the flow (vertical axis) direction of the substrate or the direction perpendicular (horizontal axis) to the flow direction of the substrate by a known method such as uniaxial stretching, tenter-type sequential biaxial stretching, tenter-type simultaneous biaxial stretching and tubular-type simultaneous biaxial stretching. The stretch ratio in this case can be appropriately selected in accordance with the resin as the raw material of the substrate but is preferably from 2 to 10 times in the vertical axis direction and the horizontal axis direction, respectively.

In addition, a relaxation treatment and an off-line heat treatment may be carried out on a substrate from the viewpoint of size stability. The relaxation treatment is preferably carried out in a tenter for horizontal stretching after thermally fixing during a stretching and film formation step of the above described polyester film, or in a step from leaving the tenter until winding. The relaxation treatment is performed preferably at a treatment temperature from 80 to 200° C., and more preferably at a treatment temperature from 100 to 180° C. The relaxation treatment is also performed preferably at a relaxation ratio in the range from 0.1 to 10% in both of the longitudinal direction and the thickness-wise direction, and more preferably at a relaxation ratio of 2 to 6%. A relaxation treated substrate is improved in heat resistance by undergoing an off-line heat treatment described below and, furthermore, size stability becomes favorable.

It is preferable to coat one side or both sides of a substrate with an undercoat layer coating solution inlinely in a film formation process. Note that undercoat application during a film formation step is referred to as inline undercoat. Examples of resins used in an undercoat layer coating solution include a polyester resin, an acrylic modified polyester resin, a polyurethane resin, an acrylic resin, a vinyl resin, a vinylidene chloride resin, a polyethylene iminevinylidene resin, a polyethyleneimine resin, a polyvinyl alcohol resin, a modified polyvinyl alcohol resin and gelatin, all of which can be preferably used. Conventionally known additives can also be added to these undercoat layers. Then, coating of the above described undercoat layer can be performed in a known method such as roll coat, gravure coat, knife coat, dip coat and spray coat. A coating amount of the undercoat layer described above is preferably from about 0.01 to about 2 $g/m^2$ (dry state).

[Film Design]

The optical reflective film of the invention includes at least one unit formed by laminating a high refractive index layer and a low refractive index layer. The optical reflective film suitably has a multilayer optical interference film formed by alternately laminating a high refractive index layer and a low refractive index layer on one surface or both surfaces of a substrate. The preferred range of the total layer number of the high refractive index layer and the low refractive index layer per one surface of the substrate is 100 or less layers and more preferably 45 or less layers from the viewpoint of productivity. The lower limit of the preferred range of the total layer number of the high refractive index layer and the low refractive index layer per one surface of the substrate is not particularly limited but is preferably 5 or more layers. Incidentally, the preferred range of the total layer number of the high refractive index layer and the low refractive index layer is applicable in the case of laminating only on one surface of the substrate and is also applicable in the case of laminating on both surfaces of the substrate at the same time. In the case of laminating on both surfaces of the substrate, the total layer numbers of the high refractive index layer and the low refractive index layer on one surface and the other surface of the substrate may be the same as or different from each other. In addition, in the optical reflective film of the invention, the bottom layer (the layer in contact with the substrate) and the outermost layer may be either of the high refractive index layer or the low refractive index layer. However, it is preferable for the optical reflective film of the invention to have a layer configuration in which the bottom layer and the outermost layer are the low refractive index layer from the viewpoint that the adhesiveness of the bottom layer to the substrate, the blow casting resistance of the top layer and further the coating properties and adhesiveness of the hard coat layer and the like to the outermost layer are excellent by having a layer configuration in which the low refractive index layer is positioned as the bottom layer and the outermost layer.

It is generally preferable to design the optical reflective film so as to have a great difference in refractive index between the high refractive index layer and the low refractive index layer from the viewpoint that the reflectance to the desired ray of light can be increased with a smaller number of layers. In the invention, a difference in refractive index between at least two adjacent layers (high refractive index layer and low refractive index layer) is preferably 0.1 or more, more preferably 0.25 or more, even more preferably 0.3 or more, yet even more preferably 0.35 or more, and most preferably 0.4 or more. In addition, the upper limit is not particularly limited but is usually 1.4 or less.

The difference in refractive index and the required number of layers can be calculated using a commercially available optical design software. For example, it is required to laminate 200 or more layers in order to obtain a near infrared reflectance of 90% or more when the difference in refractive index is smaller than 0.1, and thus not only the productivity is lowered but also the scattering at the interface between the layers is great, the transparency deteriorates, and it is significantly difficult to manufacture the film without failure in some cases.

It is preferable that the difference in refractive index between the high refractive index layer and the low refractive index layer be within the suitable range of the difference in refractive index described above in the case of alternately laminating the high refractive index layer and the low refractive index layer in the optical reflective film. However, the outermost layer and the bottom layer may have a configuration which is out of the suitable range of the difference in refractive index described above, for example, in the case of forming the outermost layer as the layer to protect the film or in the case of forming the bottom layer as the adhesion improving layer with the substrate.

Meanwhile, in the present specification, the terms "high refractive index layer" and "low refractive index layer" mean that the refractive index layer having a higher refractive index is denoted as the high refractive index layer and the refractive index layer having a lower refractive index is denoted as the low refractive index layer in the case of comparing the difference in refractive index between two adjacent layers. Hence, the terms "high refractive index layer" and "low refractive index layer" include any form other than the form in which each refractive index layer has the same refractive index in the case of focusing on two adjacent refractive index layers in each refractive index layer constituting the optical reflective film.

Since reflection in an interface between adjacent layers depends on a refractive index ratio between layers, the larger this refractive index ratio is, the higher a reflectivity is. In addition, when an optical path difference between reflected light in the layer surface and reflected light in the bottom of the layer in the case of a single layer film is made in a relationship expressed by $n \cdot d = \text{wavelength}/4$, the reflected light can be controlled to increase each other due to a phase difference, and a reflectivity can be thus increased. Herein, n is a refractive index, d is a physical film thickness of a layer, and $n \cdot d$ is an optical film thickness. Reflection can be controlled by use of this optical path. By use of this relationship, a refractive index of each layer and a film thickness are controlled, and reflection of visible light or near-infrared light is controlled. That is, a reflectivity in a specific wavelength region can be raised by a refractive index of each layer, a film thickness of each layer and the way of laminating each layer.

The optical reflective film of the invention can be a visible light reflective film or a near infrared reflective film by changing the specific wavelength region to increase the reflectance. In other words, the optical reflective film is a visible light reflective film when the specific wavelength region to increase the reflectance is set in the visible light region, and the optical reflective film is a near infrared reflective film when the specific wavelength region to increase the reflectance is set in a near infrared region. In addition, the optical reflective film is an ultraviolet reflective film when the specific wavelength region to increase the reflectance is set in the ultraviolet light region. A (near) infrared reflective (shielding) film may be formed in the case of using the optical reflective film of the invention as a thermal insulating film. In the case of the infrared reflective film, a multilayer film formed by laminating films having different refractive indexes from each other on a polymer film is formed, and the transmittance at 550 nm in the visible light region defined by JIS R3106-1998 is preferably 50% or more, more preferably 70% or more, and even more preferably 75% or more. In addition, the transmittance at 1200 nm is preferably 35% or less, more preferably 25% or less, and even more preferably 20% or less. It is preferable to design the optical film thickness and the unit such that the transmittance is in such a suitable range. Moreover, it is preferable to have a region to have a reflectance of greater than 50% in the wavelength region of from 900 nm to 1400 nm.

The infrared region among incident spectra of direct solar light is related to increase of a room temperature and shielding the infrared region enables increase of a room temperature to be suppressed. According to accumulated energy ratio from the shortest wavelength (760 nm) to the longest wavelength (3200 nm) of infrared rays based on a weighting coefficient described in Japanese Industrial Standards JIS R3106, in the case of accumulated energy from 760 nm to each wavelength with the total energy of the whole infrared region from a wavelength of 760 nm to the longest wavelength of 3200 nm being as 100, the sum of energy from 760 to 1300 nm occupies about 75% of the entire infrared region. Therefore, shielding light in a wavelength region up to 1300 nm is efficient in terms of an energy conservation effect by shielding heat rays.

When a reflectivity in this near-infrared light region (760 to 1300 nm) is set to about 80% or more as the maximum peak value, decrease of a sensible temperature is obtained from a sensory evaluation. For example, a sensible temperature by a window facing to the southeast method in the morning in August showed a clear difference when a reflectivity in a near-infrared light region was shielded up to about 80% as the maximum peak value.

As a result of determining a multilayered film structure that is required for expressing such a function by optical simulation (FTG Software Associates Film DESIGN Version 2.23.3700), it is found that when a high refractive index layer having a refractive index of 1.9 or more, desirably 2.0 or more is employed and 6 layers or more are laminated, excellent properties can be obtained. For example, according to the results of a model simulation in which a high refractive index layer and a low refractive index layer (refractive index=1.35) are alternately laminated in 8 layers, when the refractive index of the high refractive index layer is 1.8, the reflectivity does not even reach 70%, but when the refractive index is 1.9, the reflectivity of about 80% can be obtained. In addition, in a model in which a high refractive index layer (refractive index=2.2) and a low refractive index layer (refractive index=1.35) are alternately laminated, when the number of laminated layers is 4, the reflectivity does not even reach 60%, but when the number of laminated layers is 6, the reflectivity of about 80% can be obtained.

The refractive index of low refractive index layer is preferably from 1.10 to 1.60 and more preferably from 1.30 to 1.50. The refractive index of high refractive index layer is preferably from 1.80 to 2.50 and more preferably from 1.90 to 2.20.

The thickness (thickness after drying) per one layer of the refractive index layer is preferably from 20 to 1000 nm, more preferably from 50 to 500 nm, and even more preferably from 50 to 350 nm.

The thickness of the entire optical reflective film of the invention is preferably from 12 μm to 315 μm, more preferably from 15 μm to 200 μm, and even more preferably 20 μm to 100 μm.

[Layer Configuration of Optical Reflective Film]

The optical reflective film includes at least one unit formed by laminating a high refractive index layer and a low refractive index layer on a substrate. The unit may be formed only on one surface or on both surfaces of the substrate. It is preferable that the unit be formed on both surfaces of the substrate since the reflectance at a specific wavelength is improved.

The optical reflective film may have one or more functional layers under the substrate or on the outermost layer on the side opposite to the substrate for the purpose of imparting an additional function. Examples of the functional layer may include a conductive layer, an antistatic layer, a gas barrier layer, an easily adhesive layer (adhesive layer), an antifouling layer, a deodorant layer, an anti-dropping layer, a slippery layer, a hard coat layer, an abrasion resistant layer, an antireflection layer, an electromagnetic wave shielding layer, an ultraviolet absorbing layer, an infrared absorbing layer, a printing layer, a fluorescence emitting layer, a hologram layer, a release layer, a pressure sensitive adhesive layer, an adhesive layer, an infrared cutting layer other than the high refractive index layer and the low refractive index layer described above (a metal layer and a liquid crystal layer), a colored layer (visible light absorbing layer), and an intermediate film layer used in a laminated glass.

The order of laminating the above-mentioned various kinds of functional layers described above in the reflective film is not particularly limited.

For example, in the case of pasting (inner pasting) the optical reflective film on the indoor side of the window glass, a form in which an optical reflective layer including at least one unit formed by laminating the high refractive index layer and the low refractive index layer and a pressure sensitive adhesive layer are laminated on the substrate surface in this order and further a hard coat layer is provided by coating on the substrate surface on the side opposite to the side where these layers are laminated is mentioned as a preferred example. In addition, the pressure sensitive adhesive layer, the substrate, the optical reflective layer and the hard coat layer may be laminated in this order, and the optical reflective film may further have another functional layer and another substrate or an infrared absorber and the like. In addition, a preferred example of the case of pasting (outer pasting) the optical reflective film on the outdoor side of the window glass may include a configuration in which an optical reflective layer and a pressure sensitive adhesive layer are laminated on the substrate surface in this order and further a hard coat layer is provided by coating on the substrate surface on the side opposite to the side where these layers are laminated. The pressure sensitive adhesive layer, the substrate, the optical reflective layer and the hard coat layer may be laminated in this order, and the optical reflective film may further have another functional layer and another substrate or an infrared absorber and the like in the same manner in the case of inner pasting.

[Application of Optical Reflective Film: Optical Reflector]

The optical reflective film of the invention can be applied to a wide range of fields. In other words, a suitable embodiment of the invention is an optical reflector in which the optical reflective film described above is provided on at least one surface of a base structure. For example, the optical reflective film is attached to facility (base structure) exposed to solar light for a long time such as outside windows in buildings and automobile windows, and used for the purpose of mainly enhancing weather resistance as a film for window attachment such as a heat ray reflective film that imparts an effect of heat ray reflection, a film for an agricultural plastic green house, and the like. In particular, the optical reflective film according to the present invention is favorable for a member in which the optical reflective film according to the invention is attached directly or through an adhesive agent to a base structure such as glass or a glass substitute resin.

Specific examples of the base structure may include glass, a polycarbonate resin, a polysulfone resin, an acrylic resin, a polyolefin resin, a polyether resin, a polyester resin, a polyamide resin, a polysulfide resin, an unsaturated polyester resin, an epoxy resin, a melamine resin, a phenol resin, a diallyl phthalate resin, a polyimide resin, an urethane resin, a polyvinyl acetate resin, a polyvinyl alcohol resin, a styrene resin, a vinyl chloride resin, a metal plate and a ceramic. The kind of resin may be any of a thermoplastic resin, a thermosetting resin and an ionizing radiation curable resin, and two or more of these may be used in combination. The base structure can be produced by a known method such as extrusion molding, calender molding, injection molding, blow molding and compression molding. The thickness of the base substance is not particularly limited but is usually from 0.1 mm to 5 cm.

It is preferable that the adhesive layer or pressure sensitive adhesive layer to bond the optical reflective film with a base structure be provided so as to install the optical reflective film on the sunlight (heat ray) incident side. Moreover, it is preferable that the optical reflective film be sandwiched between the window glass and the base structure since it can be sealed from the surrounding gas such as moisture so as to be excellent in durability. The infrared shielding film according to the invention is also preferably installed outdoor and the outside of a vehicle (for outer pasting) since it has environmental durability.

It is preferable that the adhesive layer or pressure sensitive adhesive layer to bond the optical reflective film with a base structure be installed such that the optical reflective film is on the sunlight (heat ray) incident side when bonded to the window glass and the like. Moreover, it is preferable that the optical reflective film be sandwiched between the window glass and the base substance since it can be sealed from the surrounding gas such as moisture so as to be durable. The optical reflective film according to the invention is also preferably installed outdoor and the outside of a vehicle (for outer pasting) since it has environmental durability.

As the adhesive applicable to the invention, it is possible to use an adhesive having a photocurable or thermosetting resin as the main component.

The adhesive is preferably those having durability to ultraviolet light, and an acrylic pressure sensitive adhesive or a silicone-based pressure sensitive adhesive is preferable. Furthermore, an acrylic pressure sensitive adhesive is preferable from the viewpoint of pressure sensitive adhesive properties and cost. In particular, a solvent-based cohesive agent is preferable among solvent-based cohesive agents and emulsion-based cohesive agents in acrylic cohesive agents from the viewpoint that peeling strength is easily controlled.

When a solution polymerization polymer is used as an acrylic solvent-based cohesive agent, a known monomer can be used as its monomer.

In addition, a polyvinyl butyral-based resin used as an intermediate layer of laminated glass or an ethylene-vinyl acetate copolymer-based resin may be used. Specific examples thereof may include plastic polyvinyl butyral [those manufactured by SEKISUI CHEMICAL CO., LTD., Mitsubishi Monsanto Chemical Co. and the like], an ethylene-vinyl acetate copolymer [DURAMINE manufactured by DuPont and Takeda Pharmaceutical Company Limited], a modified ethylene-vinyl acetate copolymer [Melthene-G manufactured by TOSOH CORPORATION] and the like. Meanwhile, an ultraviolet absorber, an antioxidant, an antistatic agent, a heat stabilizer, a lubricant, a filler, a coloring, an adhesion control agent and the like may be added to and blended in the adhesive layer.

EXAMPLES

Hereinafter, the invention will be specifically described with reference to Examples, but the invention is not limited to these. Meanwhile, the term "parts" or "%" used in Examples represents "parts by mass" or "% by mass" unless otherwise stated.

Example 1

Manufacturing of Infrared Shielding Film

[Preparation of Coating Liquid]
(Preparation of Coating Liquid for Low Refractive Index Layer L1)

To 45 parts by mass of a 10% by mass aqueous solution of fluorine-containing polymer 1 to be described below, 10 parts by mass of a 3% by mass aqueous solution of boric acid was added and heated to 45° C., 40 parts by mass of a 5% by mass aqueous solution of polyvinyl alcohols (mixture of 43:5:9:43 (solid content mass ratio) of JC-25 (degree of polymerization: 2500, degree of saponification: 99.5 mol %, and JAPAN VAM & POVAL CO., LTD.), JM-17 (degree of polymerization: 1700, degree of saponification: 96.4 mol %, and JAPAN VAM & POVAL CO., LTD.), JP-15 (degree of polymerization: 1500, degree of saponification: 89.8 mol %, and manufactured by JAPAN VAM & POVAL CO., LTD.) and JL-25E (degree of polymerization: 2500, degree of saponification: 79.5 mol %, and manufactured by JAPAN VAM & POVAL CO., LTD.)) and 1 part by mass of a 1% by mass aqueous solution of a surfactant (RAPISOL A30 manufactured by NOF CORPORATION) were added thereto while stirring, and 2 parts by mass of pure water was then added thereto, thereby preparing the coating liquid for low refractive index layer L1.
(Preparation of Aqueous Solution of Fluorine-Containing Polymer 1)

Into a 1 L flask which is equipped with a reflux condenser, 6.4 g of 1H,1H,2H,2H-heptadecafluorodecyl acrylate, 26.4 g of methoxy polyethylene glycol #1000 methacrylate and 34.9 g of methyl methacrylate were added to a mixed solvent of 150 ml of isopropanol and 100 ml of pure water under a nitrogen atmosphere. The resulting mixture was stirred for 1 hour at room temperature, thereafter 1.2 g of ammonium persulfate dissolved in 10 ml of pure water was added thereto and heated and stirred at 65° C. for 16 hours. The reaction mixture thus obtained was cooled, isopropanol was then evaporated therefrom by a rotary evaporator, and further pure water was added thereto, thereby preparing a 10% by mass aqueous solution of fluorine-containing polymer 1. The molecular weight thereof measured using GPC was 16,000.
(Preparation of Coating Liquid for Low Refractive Layer L2)

To 22.5 parts by mass of colloidal silica (SNOWTEX OS manufactured by NISSAN CHEMICAL INDUSTRIES, LTD., solid content: 20% by mass), 22.5 parts by mass of pure water, 10 parts by mass of a 5% by mass aqueous solution of a polyoxyalkylene-based dispersant (MALIALIM AKM-0531 manufactured by NOF CORPORATION) and 10 parts by mass of a 3% by mass aqueous solution of boric acid were added, respectively, and heated to 45° C., 40 parts by mass of a 5% by mass aqueous solution of polyvinyl alcohols (mixture of 43:5:9:43 (solid content mass ratio) of JC-25 (degree of polymerization: 2500, degree of saponification: 99.5 mol %, and JAPAN VAM & POVAL CO., LTD.), JM-17 (degree of polymerization: 1700, degree of saponification: 96.4 mol %, and JAPAN VAM & POVAL CO., LTD.), JP-15 (degree of polymerization: 1500, degree of saponification: 89.8 mol %, and manufactured by JAPAN VAM & POVAL CO., LTD.) and JL-25E (degree of polymerization: 2500, degree of saponification: 79.5 mol %, and manufactured by JAPAN VAM & POVAL CO., LTD.)) and 1 part by mass of a 1% by mass aqueous solution of a surfactant (RAPISOL A30 manufactured by NOF CORPORATION) were added thereto while stirring, and 2 parts by mass of pure water was then added thereto, thereby preparing the coating liquid for low refractive index layer L2.
(Preparation of Coating Liquids for Low Refractive Layer L3 to L15)

The coating liquids for low refractive layer L3 to L15 were prepared in the same manner as the coating liquid for low refractive index layer L2 except that 5% by mass aqueous solutions of the polyvinyl alcohols (single substance or a mixture) presented in Table 1 were used instead of the 5% by mass aqueous solution of polyvinyl alcohols (mixture of 43:5:9:43 (solid content mass ratio) of JC-25 (degree of polymerization: 2500, degree of saponification: 99.5 mol %, and manufactured by JAPAN VAM & POVAL CO., LTD.), JM-17 (degree of polymerization: 1700, degree of saponification: 96.4 mol %, and manufactured by JAPAN VAM & POVAL CO., LTD.), JP-15 (degree of polymerization: 1500, degree of saponification: 89.8 mol %, and manufactured by JAPAN VAM & POVAL CO., LTD.) and JL-25E (degree of polymerization: 2500, degree of saponification: 79.5 mol %, and manufactured by JAPAN VAM & POVAL CO., LTD.)).

Meanwhile, in Table 1, PVA-613 has a degree of polymerization of 1300, a degree of saponification of 93.2 mol % and is manufactured by KURARAY CO., LTD., PVA-505 has a degree of polymerization of 500, a degree of saponification of 73.5 mol % and is manufactured by KURARAY CO., LTD., PVA-103 has a degree of polymerization of 300, a degree of saponification of 98.5 mol % and is manufactured by KURARAY CO., LTD., PVA-235 has a degree of polymerization of 3500, a degree of saponification of 88.0 mol % and is manufactured by KURARAY CO., LTD., Z-100 has a degree of polymerization of 500, degree of saponification of 99.0 mol % and is GOHSEFIMER (registered trademark) Z manufactured by The Nippon Synthetic Chemical Industry Co., Ltd., and R-1130 has a degree of polymerization of 1700, a degree of saponification of 98.5 mol % and is manufactured KURARAY CO., LTD.

(Preparation of Coating Liquid for High Refractive Index Layer H1)

To 80 parts by mass of a 5% by mass aqueous solution of polyvinyl alcohol (PVA-217, degree of polymerization: 1700, degree of saponification: 88.0 mol % and manufactured by KURARAY CO., LTD.), 1 part by mass of a 1% by mass aqueous solution of a surfactant (RAPISOL A30 manufactured by NOF CORPORATION) was added while heating at 45° C. and stirring, and 19 parts by mass of pure water was then added thereto, thereby preparing the coating liquid for high refractive index layer H1.

(Preparation of Coating Liquid for High Refractive Index Layer H2)

To 30 parts by mass of a zirconia sol (SZR-W, solid content: 30% by mass, manufactured by SAKAI CHEMICAL INDUSTRY CO., LTD. and particle size (D50): 3 nm), 10 parts by mass of a 5% by mass of aqueous solution of a polyoxyalkylene-based dispersant (MALIALIM AKM-0531 manufactured by NOF CORPORATION), 10 parts by mass a 3% by mass aqueous solution of boric acid and 10 parts by mass a 2% by mass aqueous solution of citric acid were added in this order and then heated to 45° C., 20 parts by mass of a 5% by mass aqueous solution of polyvinyl alcohol (PVA-217, degree of polymerization: 1700, degree of saponification: 88.0 mol % and manufactured by KURARAY CO., LTD.) and 1 part by mass of a 1% by mass aqueous solution of a surfactant (RAPISOL A30 manufactured by NOF CORPORATION) were added while stirring, and 19 parts by mass of pure water was then added thereto, thereby preparing the coating liquid for high refractive index layer H2.

(Preparation of Coating Liquids for High Refractive Layer H3 to H6 and H14 to H16)

The coating liquids for high refractive layer H3 to H6 and H14 to H16 were prepared in the same manner as the coating liquid for high refractive index layer H2 except that 5% by mass aqueous solutions of the polyvinyl alcohols (single substance or a mixture) presented in Table 1 were used instead of the 5% by mass aqueous solution of the polyvinyl alcohol (PVA-217, degree of polymerization: 1700, degree of saponification: 88.0 mol % and manufactured by KURARAY CO., LTD.).

(Preparation of Silica Attached Titanium Dioxide Sol)

To 0.5 parts by mass of a 15.0% by mass titanium oxide sol (SRD-W, volume average particle size of 5 nm, rutile type titanium dioxide particles and manufactured by SAKAI CHEMICAL INDUSTRY CO., LTD.), 2 parts by mass of pure water was added and then heated to 90° C. Subsequently, 1.3 parts by mass of an aqueous solution of silicic acid (solution obtained by diluting sodium silicate No. 4 (manufactured by Nippon Chemical Industrial Co., Ltd.) with pure water so as to have a $SiO_2$ concentration of 2.0% by mass) was slowly added thereto, thereafter the resulting mixture was subjected to the heat treatment at 175° C. for 18 hours in the autoclave, cooled and then concentrated using an ultrafiltration membrane, thereby obtaining a titanium dioxide sol which has a solid content concentration of 20% by mass and $SiO_2$ attached on the surface (hereinafter, silica attached titanium dioxide sol).

(Preparation of Coating Liquid for High Refractive Index Layer H7)

To 45 parts by mass of the silica attached titanium dioxide sol (solid content: 20.0% by mass) obtained above, 10 parts by mass of a 5% by mass aqueous solution of a polyoxyalkylene-based dispersant (MALIALIM AKM-0531 manufactured by NOF CORPORATION), 10 parts by mass a 3% by mass aqueous solution of boric acid and 10 parts by mass a 2% by mass aqueous solution of citric acid were added in this order and then heated to 45° C., 20 parts by mass of a 5% by mass aqueous solution of polyvinyl alcohols (mixture of 10:25:25:13:13:14 (solid content mass ratio) of JC-25 (degree of polymerization: 2500, degree of saponification: 99.5 mol %, and manufactured by JAPAN VAM & POVAL CO., LTD.), JM-17 (degree of polymerization: 1700, degree of saponification: 96.4 mol %, and manufactured by JAPAN VAM & POVAL CO., LTD.), JP-15 (degree of polymerization: 1500, degree of saponification: 89.8 mol %, and manufactured by JAPAN VAM & POVAL CO., LTD.), JP-33 (degree of polymerization: 3300, degree of saponification: 86.7 mol %, and manufactured by JAPAN VAM & POVAL CO., LTD.), JE-18E (degree of polymerization: 1800, degree of saponification: 83.5 mol %, and manufactured by JAPAN VAM & POVAL CO., LTD.) and JL-25E (degree of polymerization: 2500, degree of saponification: 79.5 mol %, and manufactured by JAPAN VAM & POVAL CO., LTD.)) and 1 part by mass of a 1% by mass aqueous solution of a surfactant (RAPISOL A30 manufactured by NOF CORPORATION) were added thereto while stirring, and 4 parts by mass of pure water was then added thereto, thereby preparing the coating liquid for high refractive index layer H7.

(Preparation of Coating Liquids for High Refractive Layer H8 to H13)

The coating liquids for high refractive layer H8 to H13 were prepared in the same manner as the coating liquid for high refractive index layer H7 except that 5% by mass aqueous solutions of the polyvinyl alcohols (single substance or a mixture) presented in Table 1 were used instead of the 5% by mass aqueous solution of polyvinyl alcohols (mixture of 10:25:25:13:13:14 (solid content mass ratio) of JC-25 (degree of polymerization: 2500, degree of saponification: 99.5 mol %, and manufactured by JAPAN VAM & POVAL CO., LTD.), JM-17 (degree of polymerization: 1700, degree of saponification: 96.4 mol %, and manufactured by JAPAN VAM & POVAL CO., LTD.), JP-15 (degree of polymerization: 1500, degree of saponification: 89.8 mol %, and manufactured by JAPAN VAM & POVAL CO., LTD.), JP-33 (degree of polymerization: 3300, degree of saponification: 86.7 mol %, and manufactured by JAPAN VAM & POVAL CO., LTD.), JE-18E (degree of polymerization: 1800, degree of saponification: 83.5 mol %, and manufactured by JAPAN VAM & POVAL CO., LTD.) and JL-25E (degree of polymerization: 2500, degree of saponification: 79.5 mol %, and manufactured by JAPAN VAM & POVAL CO., LTD.)).

Meanwhile, in Table 1, PVA-117 has a degree of polymerization of 1700, a degree of saponification of 98.5 mol % and is manufactured by KURARAY CO., LTD.

[Preparation of Optical Reflective Film]

(Preparation of Sample 1)

Simultaneous multilayer coating of the low refractive index layer coating solution L1 and the high refractive index layer coating solution H1 was performed on a 50 μm-thickness polyethylene terephthalate film (A4300 manufactured by TOYOBO CO., LTD.: double-sided easily adhesive layer) warmed at 45° C. while keeping the coating solutions at 45° C., using a slide hopper coating device capable of multilayer coating of 9 layers, such that total 9 layers were alternately coated to have a film thickness at the time of dry of each low refractive index layer of 150 nm and each high refractive index layer of 150 nm.

Immediately after coating, cold air at 5° C. was blown thereto for 5 minutes, and then hot air at 80° C. was blown thereto to dry, thereby preparing a multilayer coated article consisting of 9 layers.

The 9-layer multilayer coating was further performed 2 times on the 9-layer multilayer coated article, thereby preparing the sample 1 consisting of 27 layers in total.
(Preparation of samples 2 to 17 and 19 to 21)

The samples 2 to the 17 and 19 to 21 were prepared using the coating liquids for low refractive index layer and the coating liquids for high refractive index layer in combination presented in Table 1 instead of the coating liquid for low refractive index layer L1 and the coating liquid for high refractive index layer H1.
(Preparation of Sample 18)

Simultaneous multilayer coating of the low refractive index layer coating solution L13 and the high refractive index layer coating solution H13 was performed on a 50 μm-thickness polyethylene terephthalate film (A4300 manufactured by TOYOBO CO., LTD.: double-sided easily adhesive layer) warmed at 45° C. while keeping the coating solutions at 45° C., using a slide hopper coating device capable of multilayer coating of 9 layers, such that total 9 layers were alternately coated to have a film thickness at the time of dry of each low refractive index layer of 150 nm and each high refractive index layer of 150 nm.

Immediately after coating, cold air at 5° C. was blown thereto for 5 minutes, and then hot air at 80° C. was blown thereto to dry, thereby preparing a multilayer coated article consisting of 9 layers.

The 9-layer multilayer coating was further performed 2 times on the 9-layer multilayer coated article, thereby preparing a multilayer coated article consisting of 27 layers in total.

The 9-layer multilayer coating was further performed 3 times on the back surface of the 27-layer multilayer coated article, thereby preparing the sample 18 consisting of 54 layers in total.
<<Evaluation of Infrared Shielding Film>>

The evaluation on the following performances of each of the infrared shielding films (Samples 1 to 21) fabricated above was performed.
(Measurement of Single Film Refractive Index of Each Layer)

The samples were fabricated by coating each of the target layers (high refractive index layer and low refractive index layer) for the refractive index measurement on a substrate in a single layer, respectively, and the refractive index of each of the high refractive index layer and the low refractive index layer was measured according to the following method.

A surface roughening treatment was carried out on a back side serving as a measurement side of each sample, a light absorbing treatment was then carried out with a black spray to prevent light reflection in the back side and a reflectivity in a visible light region (400 nm to 700 nm) was measured in a condition of 5 degrees of regular reflection, and as a result, the refractive index was determined by using U-4000 type (manufactured by Hitachi, Ltd.) as a spectrophotometer.

From the result of the refractive index of each layer measured according to the above method, it has been confirmed that a difference in refractive index between the high refractive index layer and the low refractive index layer is less than 0.1 for the sample 1 and 0.1 or more for all of the samples 2 to 21.
(Adhesiveness)

With regard to the infrared shielding film which was subjected to the heat shock test (preserved in a high temperature (60° C.) environment for 12 hours and then rapidly preserved in a low temperature (−20° C.) environment for 12 hours for 1 cycle and repeated 50 cycles) and then preserved in a room temperature (25° C.) environment for 12 hours, squares of 10 mm$^2$ were formed by crosscutting the outermost surface of the sample thus obtained at an angle of 90° against the blade surface of the single-edged razor and intervals of 2 mm in accordance with the crosscut method of JIS-K5600-5-6:1999. To the squares thus obtained, the cellophane tape No. 29 manufactured by NITTO DENKO CORPORATION was pasted, the tape was peeled off therefrom, and the peeling state of the film was examined.

$F = n_1/n \times 100(\%)$ was calculated where n denoted the number of crosscut squares and $n_1$ denoted the number of squares having the film remained on the support after peeling off the tape, and the evaluation was performed according to the following criteria.

⊙: F≥90%
○: 90%>F≥80%
Δ: 80%>F≥70%
×: 70%>F

Meanwhile, it can be said that the adhesiveness between layers is secured when F is 70% or more in practical use.
(Measurement of Visible Light Transmittance and Near Infrared Transmittance)

With regard to the infrared shielding film which was subjected to the heat shock test (preserved in a high temperature (60° C.) environment for 12 hours and then rapidly preserved in a low temperature (−20° C.) environment for 12 hours for 1 cycle and repeated 50 cycles) and then preserved in a room temperature (25° C.) environment for 12 hours, the transmittance of the infrared shielding film sample was measured in the region of from 300 nm to 2000 nm using a spectrophotometer (U-4000 model manufactured by Hitachi, Ltd., integrating sphere used). The value of transmittance at 550 nm was adopted as the visible light transmittance and the value of transmittance at 1200 nm was adopted as the near infrared transmittance.

Meanwhile, in the above evaluation, the visible light transmittance and the near infrared transmittance were measured in the heat shock test in order to clarify the difference between the results.

The evaluation results are presented in Table 1.

|  |  | High refractive index layer | | | | Low refractive index layer | | | | | Difference in degree of saponification between high refractive index and low layer refractive index layer (mol %) | Evaluation | | |
|---|---|---|---|---|---|---|---|---|---|---|---|---|---|---|
|  |  | Coating liquid | PVA | Degree of polymerization | Degree of saponification (mol %) | Content (mass(%) with respect to the entire PVA) | Average degree of saponification (mol %) | Coating liquid | PVA | Degree of saponification (mol %) | Degree of polymerization | Content (mass (%) with respect to the entire PVA) | Average degree of saponification (mol %) |  | Visible light transmittance (%) | Infared transmittance (%) | Adhesiveness |
| Example | Sample 1 | H1 | PVA-217 | 1700 | 88.0 | 100 | 88.0 | L1 | JC-25<br>JM-17<br>JP-15<br>JL-25E | 99.5<br>96.4<br>89.8<br>79.5 | 2500<br>1700<br>1500<br>2500 | 43<br>5<br>9<br>43 | 89.9 | 1.9 | 70 | 34 | △ |
|  | Sample 2 | H2 | PVA-217 | 1700 | 88.0 | 100 | 88.0 | L2 | JC-25<br>JM-17<br>JP-15<br>JL-25E | 99.5<br>96.4<br>89.8<br>79.5 | 2500<br>1700<br>1500<br>2500 | 43<br>5<br>9<br>43 | 89.9 | 1.9 | 73 | 24 | △ |
|  | Sample 3 | H2 | PVA-217 | 1700 | 88.0 | 100 | 88.0 | L3 | JC-25<br>JM-17<br>JP-15<br>JL-25E | 99.5<br>96.4<br>89.8<br>79.5 | 2500<br>1700<br>1500<br>2500 | 41<br>5<br>13<br>41 | 89.9 | 1.9 | 73 | 21 | ○ |
|  | Sample 4 | H3 | JP-33 | 3300 | 86.7 | 100 | 86.7 | L4 | JC-25<br>JM-17<br>JP-15<br>JP-33<br>JL-18E<br>JL-25E | 99.5<br>96.4<br>89.8<br>86.7<br>83.5<br>79.5 | 2500<br>1700<br>1500<br>3300<br>1800<br>2500 | 10<br>25<br>25<br>13<br>13<br>14 | 89.8 | 3.1 | 73 | 23 | ○ |
|  | Sample 5 | H4 | JL-18E | 1800 | 83.5 | 100 | 83.5 | L4 | JC-25<br>JM-17<br>JP-15<br>JP-33<br>JL-18E<br>JL-25E | 99.5<br>96.4<br>89.8<br>86.7<br>83.5<br>79.5 | 2500<br>1700<br>1500<br>3300<br>1800<br>2500 | 10<br>25<br>25<br>13<br>13<br>14 | 89.8 | 6.3 | 76 | 19 | ○ |
|  | Sample 6 | H5 | JL-25E | 2500 | 79.5 | 100 | 79.5 | L4 | JC-25<br>JM-17<br>JP-15<br>JP-33<br>JL-18E<br>JL-25E | 99.5<br>96.4<br>89.8<br>86.7<br>83.5<br>79.5 | 2500<br>1700<br>1500<br>3300<br>1800<br>2500 | 10<br>25<br>25<br>13<br>13<br>14 | 89.8 | 10.3 | 82 | 19 | ○ |
|  | Sample 7 | H6 | JC-25<br>JM-17<br>JP-15<br>JP-33<br>JL-18E<br>JL-25E | 2500<br>1700<br>1500<br>3300<br>1800<br>2500 | 99.5<br>96.4<br>89.8<br>86.7<br>83.5<br>79.5 | 10<br>25<br>25<br>13<br>13<br>14 | 89.8 | L5 | JC-25 | 99.5 | 2500 | 100 | 99.5 | 9.7 | 81 | 15 | ○ |

-continued

| | | High refractive index layer | | | | | Low refractive index layer | | | | | | Evaluation | | |
|---|---|---|---|---|---|---|---|---|---|---|---|---|---|---|---|
| | | | | | Content | Average | | | | | Content | Average | Difference in degree of saponification between high refractive index and low layer refractive index layer (mol %) | Visible light transmittance (%) | Infrared transmittance (%) | Adhesiveness |
| | Coating liquid | PVA | Degree of polymerization | Degree of saponification (mol %) | (mass(%) with respect to the entire PVA) | degree of saponification (mol %) | Coating liquid | PVA | Degree of saponification (mol %) | Degree of polymerization | (mass (%) with respect to the entire PVA) | degree of saponification (mol %) | | | | |
| Sample 8 | H7 | JC-25<br>JM-17<br>JP-15<br>JP-33<br>JL-18E<br>JL-25E | 2500<br>1700<br>1500<br>3300<br>1800<br>2500 | 99.5<br>96.4<br>89.8<br>86.7<br>83.5<br>79.5 | 10<br>25<br>25<br>13<br>13<br>14 | 89.8 | L5 | JC-25 | 99.5 | 2500 | 100 | 99.5 | 9.7 | 78 | 17 | ○ |
| Sample 9 | H8 | JC-25 | 2500 | 99.5 | 100 | 99.5 | L6 | JC-25<br>JM-17<br>PVA-613<br>JP-15<br>JP-33<br>JL-18E<br>JL-25E<br>PVA-505 | 99.5<br>96.4<br>93.2<br>89.8<br>86.7<br>83.5<br>79.5<br>73.5 | 2500<br>1700<br>1300<br>1500<br>3300<br>1800<br>2500<br>500 | 14<br>13<br>13<br>12<br>12<br>12<br>12<br>12 | 88.1 | 11.4 | 79 | 9 | ○ |
| Example 10 | H9 | JC-25<br>JP-15 | 2500<br>1500 | 99.5<br>89.8 | 80<br>20 | 97.6 | L6 | JC-25<br>JM-17<br>PVA-613<br>JP-15<br>JP-33<br>JL-18E<br>JL-25E<br>PVA-505 | 99.5<br>96.4<br>93.2<br>89.8<br>86.7<br>83.5<br>79.5<br>73.5 | 2500<br>1700<br>1300<br>1500<br>3300<br>1800<br>2500<br>500 | 14<br>13<br>13<br>12<br>12<br>12<br>12<br>12 | 88.1 | 9.5 | 80 | 9 | ⊙ |
| Sample 11 | H10 | PVA-117<br>PVA-217 | 1700<br>1700 | 98.5<br>88.0 | 80<br>20 | 96.4 | L6 | JC-25<br>JM-17<br>PVA-613<br>JP-15<br>JP-33<br>JL-18E<br>JL-25E<br>PVA-505 | 99.5<br>96.4<br>93.2<br>89.8<br>86.7<br>83.5<br>79.5<br>73.5 | 2500<br>1700<br>1300<br>1500<br>3300<br>1800<br>2500<br>500 | 14<br>13<br>13<br>12<br>12<br>12<br>12<br>12 | 88.1 | 8.3 | 82 | 9 | ⊙ |

-continued

| | | High refractive index layer | | | | | Low refractive index layer | | | | | | Difference in degree of saponification between high refractive index and low layer refractive index layer (mol %) | Evaluation | | |
|---|---|---|---|---|---|---|---|---|---|---|---|---|---|---|---|---|
| | Coating liquid | PVA | Degree of polymerization | Degree of saponification (mol %) | Content (mass%) with respect to the entire PVA | Average degree of saponification (mol %) | Coating liquid | PVA | Degree of saponification (mol %) | Degree of polymerization | Content (mass %) with respect to the entire PVA | Average degree of saponification (mol %) | | Visible light transmittance (%) | Infrared transmittance (%) | Adhesiveness |
| Sample 12 | H11 | PVA-117 | 1700 | 98.5 | 100 | 98.5 | L7 | JC-25<br>JP-15<br>JP-33<br>JL-18E<br>JL-25E<br>PVA-505 | 99.5<br>89.8<br>86.7<br>83.5<br>79.5<br>73.5 | 2500<br>1500<br>3300<br>1800<br>2500<br>500 | 20<br>19<br>19<br>19<br>19<br>4 | 87.3 | 11.2 | 80 | 11 | ⊙ |
| Example Sample 13 | H12 | PVA-613<br>JP-15<br>JP-33 | 1300<br>1500<br>3300 | 93.2<br>89.8<br>86.7 | 40<br>30<br>30 | 90.2 | L8 | PVA-613<br>JM-17<br>JC-25 | 93.2<br>96.4<br>99.5 | 1300<br>1700<br>2500 | 40<br>30<br>30 | 96.1 | 5.9 | 74 | 20 | ⊙ |
| Sample 14 | H13 | PVA-103<br>PVA-117 | 300<br>1700 | 98.5<br>98.5 | 30<br>70 | 98.5 | L9 | PVA-103<br>PVA-235 | 98.5<br>88.0 | 300<br>3500 | 60<br>40 | 94.3 | 4.2 | 74 | 21 | ⊙ |
| Sample 15 | H13 | PVA-103<br>PVA-117 | 300<br>1700 | 98.5<br>98.5 | 30<br>70 | 98.5 | L10 | Z-100<br>PVA-706 | 99.0<br>91.5 | 500<br>3500 | 60<br>40 | 96.0 | 2.5 | 72 | 19 | ⊙ |
| Sample 16 | H13 | PVA-103<br>PVA-117 | 300<br>1700 | 98.5<br>98.5 | 30<br>70 | 98.5 | L11 | R-1130<br>PVA-235 | 98.5<br>88 | 1700<br>3500 | 60<br>40 | 94.3 | 4.2 | 74 | 19 | ⊙ |
| Sample 17 | H13 | PVA-103<br>PVA-117 | 300<br>1700 | 98.5<br>98.5 | 30<br>70 | 98.5 | L12 | R-1130<br>PVA-235 | 98.5<br>88.0 | 1700<br>3500 | 30<br>70 | 91.2 | 7.3 | 81 | 17 | ⊙ |
| Sample 18 | H13 | PVA-103<br>PVA-117 | 300<br>1700 | 98.5<br>98.5 | 30<br>70 | 98.5 | L12 | R-1130<br>PVA-235 | 98.5<br>88.0 | 1700<br>3500 | 30<br>70 | 91.2 | 7.3 | 81 | 5 | ⊙ |

-continued

| | | High refractive index layer | | | | | Low refractive index layer | | | | | Difference in degree of saponification between high refractive index and low refractive index layer (mol %) | Evaluation | | |
|---|---|---|---|---|---|---|---|---|---|---|---|---|---|---|---|
| | | | | | Content | Average | | | | | Content | Average | | | | |
| | Coating liquid | PVA | Degree of polymerization | Degree of saponification (mol %) | (mass(%) with respect to the entire PVA) | degree of saponification (mol %) | Coating liquid | PVA | Degree of saponification (mol %) | Degree of polymerization | (mass (%) with respect to the entire PVA) | Average degree of saponification (mol %) | | Visible light transmittance (%) | Infrared transmittance (%) | Adhesiveness |
| Comparative Example | Sample 19 | H14 | PVA-117 | 1700 | 98.5 | 100 | 98.5 | L13 | JC-25 | 99.5 | 2500 | 84 | 98.5% | 0.0 | 63 | 38 | × |
| | | | | | | | | | PVA-613 | 93.2 | 1300 | 16 | | | | | |
| | Sample 20 | H15 | JC-25 | 2500 | 99.5 | 100 | 99.5 | L5 | JC-25 | 99.5 | 2500 | 100 | 99.5% | 0.0 | 64 | 42 | × |
| | Sample 21 | H16 | PVA-217 | 1700 | 88.0 | 100 | 88.0 | L14 | PVA-217 | 88.0 | 1700 | 100 | 88.0% | 0.0 | 62 | 40 | × |

In Table 1, the underline and the double underline indicate "approximately the same polyvinyl alcohol (group)".

As can be clearly seen from the result in Table 1, the samples 1 to 18 which are the optical reflective film of the invention are excellent in the near infrared blocking property and visible light transmission property as compared with the samples 19 to 21 which are the optical reflective film of Comparative Examples. In addition, the optical reflective film of the invention also exhibits high adhesiveness between layers.

Furthermore, the infrared transmittance is lower in the samples 2 to 18 in which the refractive index layer contains metal oxide particles. The high adhesiveness between layers is exhibited in samples 3 to 18 in which the same polyvinyl alcohol is contained at 10% by mass or more. The film characteristics (infrared transmittance or visible light transmittance) are superior in the samples 4 to 18 in which the difference between the average degree of saponification of the polyvinyl alcohols contained in the high refractive index layer and the average degree of saponification of the polyvinyl alcohols contained in the low refractive index layer is 3 mol % or more.

The infrared transmittance is even lower in the samples 7 to 12 in which one of the average degree of saponification of the polyvinyl alcohols contained in the high refractive index layer and the average degree of saponification of the polyvinyl alcohols contained in the low refractive index layer is 90 mol % or more and the other is 75 mol % or more and 90 mol % or less, and moreover, the infrared transmittance is further improved in the samples 9 to 12 in which the average degree of saponification of the polyvinyl alcohols contained in the high refractive index layer is higher than the average degree of saponification of the polyvinyl alcohols contained in the low refractive index layer. In addition, the adhesiveness between layers is further improved in the samples 10 to 18 in which the content of "approximately the same polyvinyl alcohol" is 20% by mass or more in both the high and low refractive index layers. The infrared transmittance is low in the sample 18 in which the reflective layer is formed on both surfaces of the substrate.

[Preparation of Infrared Shield]

The infrared shields 1 to 18 were prepared using the optical reflective film of the optical reflective films 1 to 18 prepared above. The optical reflective films 1 to 18 were pasted to a 20 cm×20 cm transparent acrylic resin plate having a thickness of 5 mm with an acrylic adhesive, thereby fabricating the optical reflectors 1 to 18, respectively.

[Evaluation]

The optical reflectors 1 to 18 fabricated above are readily usable despite a large size, and moreover it was possible to confirm excellent light reflection property by utilizing the optical reflective film of the invention.

The present application is based on Japanese Patent Application No. 2012-246423, filed on Nov. 8, 2012 and Japanese Patent Application No. 2013-013764, filed on Jan. 28, 2013, the entire contents of which are incorporated herein by reference.

What is claimed is:

1. An optical reflective film comprising:
   at least one unit formed by laminating a high refractive index layer and a low refractive index layer on a substrate, wherein
   each of the high refractive index layer and a low refractive index layer have at least one kind of polyvinyl alcohol;
   at least either of the high refractive index layer or the low refractive index layer contains two or more kinds of polyvinyl alcohols having different degrees of saponification;
   each of the high refractive index layer and the low refractive index layer contain at least one kind of polyvinyl alcohol having approximately the same degree of saponification; and
   an average degree of saponification of polyvinyl alcohols contained in the high refractive index layer and an average degree of saponification of polyvinyl alcohols contained in the low refractive index layer are different from each other.

2. The optical reflective film according to claim 1, wherein
   at least either of the high refractive index layer or the low refractive index layer further contains metal oxide particles, and
   a difference in refractive index between the high refractive index layer and the low refractive index layer is 0.1 or more.

3. The optical reflective film according to claim 1, wherein a content of the polyvinyl alcohols having approximately the same degree of saponification is 10% by mass or more with respect to a total amount of polyvinyl alcohols in each refractive index layer.

4. The optical reflective film according to claim 1, wherein a difference between an average degree of saponification of polyvinyl alcohols contained in the high refractive index layer and an average degree of saponification of polyvinyl alcohols contained in the low refractive index layer is 3 mol % or more.

5. The optical reflective film according to claim 4, wherein a difference between an average degree of saponification of polyvinyl alcohols contained in the high refractive index layer and an average degree of saponification of polyvinyl alcohols contained in the low refractive index layer is 5 mol % or more.

6. The optical reflective film according to claim 5, wherein a difference between an average degree of saponification of polyvinyl alcohols contained in the high refractive index layer and an average degree of saponification of polyvinyl alcohols contained in the low refractive index layer is 8 mol % or more.

7. The optical reflective film according to claim 1, wherein one of an average degree of saponification of polyvinyl alcohols contained in the high refractive index layer and an average degree of saponification of polyvinyl alcohols contained in the low refractive index layer is 90 mol % or more and the other is 75 mol % or more and 90 mol % or less.

8. The optical reflective film according to claim 1, wherein an average degree of saponification of polyvinyl alcohols contained in the high refractive index layer is higher than an average degree of saponification of polyvinyl alcohols contained in the low refractive index layer.

9. The optical reflective film according to claim 1, wherein the unit is formed on both surfaces of the substrate.

10. The optical reflective film according to claim 1, which is manufactured by simultaneous multilayer coating.

11. An optical reflector comprising the optical reflective film according to claim 1 provided on at least one surface of a base structure.

12. A method of manufacturing an optical reflective film, which is a method of manufacturing the optical reflective film according to claim 1, comprising:

a process of coating a coating liquid for the high refractive index layer and a coating liquid for the low refractive index layer on the substrate by the simultaneous multilayer coating and then drying to form an optical reflective film including the high refractive index layer and the low refractive index layer.

* * * * *